(12) United States Patent
Mardia et al.

(10) Patent No.: US 12,316,398 B2
(45) Date of Patent: May 27, 2025

(54) EFFICIENT INITIAL ACQUISITION WITH GAIN STATE PREDICTION USING MACHINE LEARNING

(71) Applicant: QUALCOMM Incorporated, San Diego, CA (US)

(72) Inventors: Khyati Bhupendrabhai Mardia, San Diego, CA (US); Yue Hong, San Diego, CA (US); Sandeep Ramannavar, San Diego, CA (US); Rohit Bhasi Thazhath, San Diego, CA (US); Shraddha Ramachandra Phadnis, San Diego, CA (US); Madhup Chandra, San Diego, CA (US); Arvind Vardarajan Santhanam, San Diego, CA (US); Shanshan Wang, San Diego, CA (US); Yongle Wu, San Diego, CA (US); Tom Chin, San Diego, CA (US); Scott Hoover, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/193,121

(22) Filed: Mar. 30, 2023

(65) Prior Publication Data
US 2024/0333409 A1 Oct. 3, 2024

(51) Int. Cl.
*G06F 15/173* (2006.01)
*G06N 5/022* (2023.01)
(Continued)

(52) U.S. Cl.
CPC ......... *H04B 17/3913* (2015.01); *G06N 5/022* (2013.01); *H04W 8/22* (2013.01); *H04W 24/06* (2013.01); *H04W 88/06* (2013.01)

(58) Field of Classification Search
CPC ..... H04B 17/3913; G06N 5/022; H04W 8/22; H04W 24/06; H04W 88/06
See application file for complete search history.

(56) References Cited

U.S. PATENT DOCUMENTS

| 2014/0081572 A1* | 3/2014 | Poornachandran ..... H04W 4/02 701/537 |
| 2018/0284758 A1* | 10/2018 | Cella ...................... G06N 3/088 |

(Continued)

FOREIGN PATENT DOCUMENTS

| WO | 2022015008 A1 | 1/2022 |
| WO | 2022258196 A1 | 12/2022 |
| WO | 2023014896 A1 | 2/2023 |

OTHER PUBLICATIONS

International Search Report and Written Opinion—PCT/US2024/013287—ISA/EPO—May 23, 2024.

*Primary Examiner* — John B Walsh
(74) *Attorney, Agent, or Firm* — Holland & Hart / QUALCOMM Incorporated

(57) ABSTRACT

Methods, systems, and devices for wireless communications are described. For example, the described techniques provide for a user equipment (UE) to predict a gain state for an initial acquisition procedure. For example, the UE may use a machine learning (ML) model to predict an initial gain state which is likely to result in a successful initial acquisition procedure (e.g., without adjusting the gain state and reattempting the initial acquisition procedure). The UE may input UE history data or crowdsourced data (e.g., from a local network or a cloud-based server) into the ML model to generate a predicted gain state which may be more likely to result in a successful initial acquisition (e.g., without reattempting the initial acquisition procedure). The UE may use the initial gain state generated by the ML model to attempt an initial acquisition procedure with a network entity.

18 Claims, 17 Drawing Sheets

(51) Int. Cl.
*H04B 17/391* (2015.01)
*H04W 8/22* (2009.01)
*H04W 24/06* (2009.01)
*H04W 88/06* (2009.01)

(56) References Cited

U.S. PATENT DOCUMENTS

| | | | |
|---|---|---|---|
| 2019/0239100 A1* | 8/2019 | Pandey | H04W 24/04 |
| 2020/0213006 A1* | 7/2020 | Graham | H04B 10/116 |
| 2021/0289406 A1* | 9/2021 | Feki | G06N 3/044 |
| 2023/0014613 A1 | 1/2023 | Je et al. | |
| 2023/0156575 A1* | 5/2023 | Sheik | H04W 76/15 |
| | | | 370/329 |

* cited by examiner

EFFICIENT INITIAL ACQUISITION WITH GAIN STATE PREDICTION USING MACHINE LEARNING

FIELD OF TECHNOLOGY

The following relates to wireless communications, including efficient initial acquisition with gain state prediction using machine learning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support efficient initial acquisition with gain state prediction using machine learning (ML). For example, the described techniques provide for a user equipment (UE) to predict a gain state for an initial acquisition procedure. For example, the UE may use an ML model to predict an initial gain state which is likely to result in a successful initial acquisition procedure (e.g., without adjusting the gain state and reattempting the initial acquisition procedure). For example, the UE may access UE history data associated with previous initial acquisition procedures performed by the UE in nearby geographic areas. The UE may input the UE history data into the ML model to generate a predicted gain state which may be more likely to result in a successful initial acquisition that a default gain state (e.g., the predicted gain state may be less likely to result in the UE reattempting the initial acquisition procedure). In some examples (e.g., if there is no UE history data available), the UE may access crowdsourced data stored by a local network or a cloud-based server to input into the ML model. The UE may use the initial gain state generated by the ML model to attempt an initial acquisition procedure with a network entity.

A method for wireless communications at a user equipment (UE) is described. The method may include providing a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE, generating, by the machine learning model and based on the set of multiple values for the set of multiple input parameters, a predicted value for an initial gain state, and performing an initial acquisition procedure with a network entity according to the predicted value for the initial gain state.

An apparatus for wireless communications at a UE is described. The apparatus may include a processor, memory coupled with the processor, and instructions stored in the memory. The instructions may be executable by the processor to cause the apparatus to provide a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE, generate, by the machine learning model and based on the set of multiple values for the set of multiple input parameters, a predicted value for an initial gain state, and perform an initial acquisition procedure with a network entity according to the predicted value for the initial gain state.

Another apparatus for wireless communications at a UE is described. The apparatus may include means for providing a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE, means for generating, by the machine learning model and based on the set of multiple values for the set of multiple input parameters, a predicted value for an initial gain state, and means for performing an initial acquisition procedure with a network entity according to the predicted value for the initial gain state.

A non-transitory computer-readable medium storing code for wireless communications at a UE is described. The code may include instructions executable by a processor to provide a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE, generate, by the machine learning model and based on the set of multiple values for the set of multiple input parameters, a predicted value for an initial gain state, and perform an initial acquisition procedure with a network entity according to the predicted value for the initial gain state.

Some examples of the method, apparatuses, and non-transitory computer-readable medium described herein may further include operations, features, means, or instructions for transmitting, to a cloud-based server, a request for the crowdsourced values for the set of multiple input parameters and receiving, from the cloud-based server based on transmitting the request, the crowdsourced values for the set of multiple input parameters associated with the current status of the UE, the crowdsourced values including multiple sets of aggregated values for the set of multiple input parameters provided to the cloud-based server by a set of multiple UEs, where providing the set of multiple values may be based on receiving the crowdsourced values from the cloud-based server.

Some examples of the method, apparatuses, and non-transitory computer-readable medium described herein may further include operations, features, means, or instructions for transmitting, to a network server, a request for the crowdsourced values for the set of multiple input parameters and receiving, from the network server based on transmitting the request, the crowdsourced values for the set of multiple input parameters associated with the current status of the UE, the crowdsourced values including multiple sets of aggregated values for the set of multiple input parameters shared between a set of multiple UEs associated with the network server, a set of multiple network entities associated with the network server, or a combination thereof, where providing the set of multiple values may be based on receiving the crowdsourced values from the network server.

Some examples of the method, apparatuses, and non-transitory computer-readable medium described herein may further include operations, features, means, or instructions for receiving, from the network server based on transmitting the request, local neighbor data and collecting the local neighbor data in local data history information.

Some examples of the method, apparatuses, and non-transitory computer-readable medium described herein may further include operations, features, means, or instructions for accessing the historical values for the set of multiple input parameters associated with the current status of the UE via a short term memory or a long term memory at the UE, where providing the set of multiple values may be based on accessing the historical values.

In some examples of the method, apparatuses, and non-transitory computer-readable medium described herein, performing the initial acquisition procedure may include operations, features, means, or instructions for performing initial acquisition with a first operator via a first subscriber identity module and performing initial acquisition with a second operator via a second subscriber identity module, where the current values for the set of multiple input parameters associated with a current status of the UE include a first subset of current values associated with the first subscriber identity module and a second subset of current values associated with the second subscriber identity module, and where the historical values or the crowdsourced values includes a first subset of historical values or crowdsourced values associated with the first subscriber identity module and a second subset of the historical values or crowdsourced values associated with the second subscriber identity module.

In some examples of the method, apparatuses, and non-transitory computer-readable medium described herein, the initial acquisition procedure may be associated with a deep acquisition scan, a shallow acquisition scan, a radio link failure acquisition scan, a public land mobile network acquisition scan, or any combination thereof.

Some examples of the method, apparatuses, and non-transitory computer-readable medium described herein may further include operations, features, means, or instructions for transmitting an initial acquisition report to a cloud-based server, a network server, or both, the initial acquisition report including an indication of the set of multiple values for the set of multiple input parameters and an indication of whether the initial acquisition procedure was successful.

Some examples of the method, apparatuses, and non-transitory computer-readable medium described herein may further include operations, features, means, or instructions for receiving an indication of a default value for the initial gain state that may be different than the predicted value for the initial gain state and selecting, from the default value and the predicted value, the predicted value for the initial gain state based on generating the predicted value for the initial gain state by the machine learning model.

In some examples of the method, apparatuses, and non-transitory computer-readable medium described herein, the set of multiple input parameters includes one or more of a location parameter, a mobility information parameter, a gain state information parameter, a channel state information parameter, a cyclic redundancy check parameter, or any combination thereof.

A method for wireless communications at a network server is described. The method may include receiving, from a set of multiple user equipments (UEs), local neighborhood data including a set of multiple values for a set of multiple input parameters, receiving, from a first UE, a request for crowdsourced values for the set of multiple input parameters, and transmitting, to the first UE based on receiving the request, the local neighborhood data.

An apparatus for wireless communications at a network server is described. The apparatus may include a processor, memory coupled with the processor, and instructions stored in the memory. The instructions may be executable by the processor to cause the apparatus to receive, from a set of multiple user equipments (UEs), local neighborhood data including a set of multiple values for a set of multiple input parameters, receive, from a first UE, a request for crowdsourced values for the set of multiple input parameters, and transmit, to the first UE based on receiving the request, the local neighborhood data.

Another apparatus for wireless communications at a network server is described. The apparatus may include means for receiving, from a set of multiple user equipments (UEs), local neighborhood data including a set of multiple values for a set of multiple input parameters, means for receiving, from a first UE, a request for crowdsourced values for the set of multiple input parameters, and means for transmitting, to the first UE based on receiving the request, the local neighborhood data.

A non-transitory computer-readable medium storing code for wireless communications at a network server is described. The code may include instructions executable by a processor to receive, from a set of multiple user equipments (UEs), local neighborhood data including a set of multiple values for a set of multiple input parameters, receive, from a first UE, a request for crowdsourced values for the set of multiple input parameters, and transmit, to the first UE based on receiving the request, the local neighborhood data.

In some examples of the method, apparatuses, and non-transitory computer-readable medium described herein, transmitting the local neighborhood data may include operations, features, means, or instructions for transmitting, to the first UE, a subset of the set of multiple values for the set of multiple input parameters corresponding to a geographic location of the first UE based on collecting the local neighborhood data form the set of multiple UEs.

DETAILED DESCRIPTION

Figure 1:
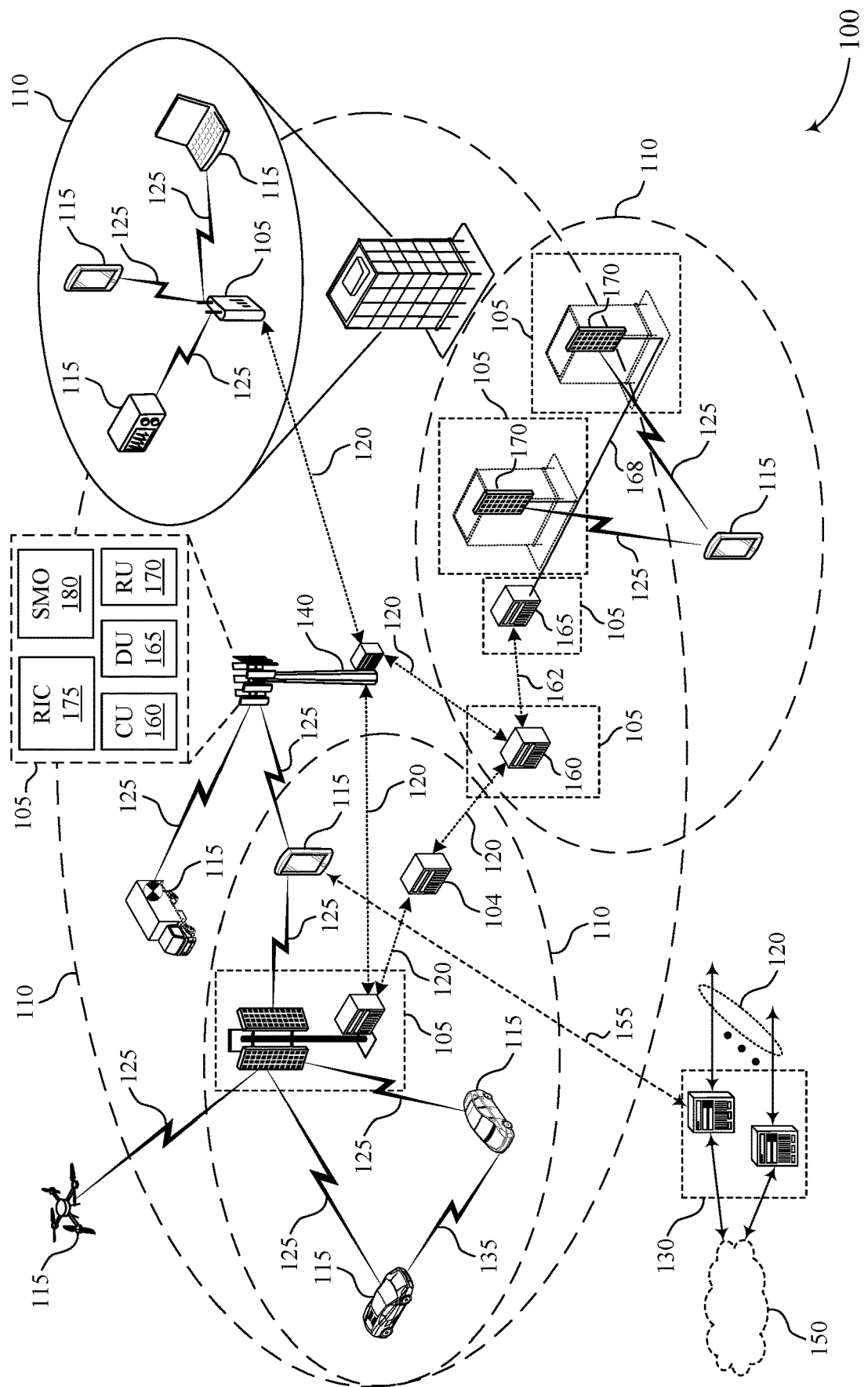
FIG. 1 shows an example of a wireless communications system that supports efficient initial acquisition with gain state prediction using machine learning (ML) in accordance with one or more aspects of the present disclosure.

In some wireless communications systems, a user equipment (UE) may perform an initial acquisition procedure to identify and establish communication with a network entity. The UE may attempt the initial acquisition procedure using a default gain state (e.g., gain_state=2). In some cases, however, the default gain state may be inadequate (e.g., may be too high or too low for successful initial acquisition) and the initial acquisition procedure may be unsuccessful. For example, various factors (geographic location of the UE, distance from the network entity, provider of the network entity, etc.) may affect the power of signals received from the network entity and, as a result, a gain state higher or lower than the default gain state may be more likely to result in a successful initial acquisition procedure. In such cases, the UE may adjust the gain state (e.g., to gain_state=7) and reattempt the initial acquisition procedure, which may cause delays in initial acquisition, increased system latency, increased signaling overhead, less efficient use of system resources, and decreased user experience.

Accordingly, techniques described herein may allow for the UE to predict a gain state for an initial acquisition procedure. For example, the UE may use a machine learning (ML) model to predict an initial gain state which is likely to result in a successful initial acquisition procedure (e.g., without adjusting the gain state and reattempting the initial acquisition procedure). The UE may use the initial gain state generated by the ML model to attempt an initial acquisition procedure with the network entity. Such procedures may result in faster and more efficient initial acquisition, decreased system latency, more efficient use of available system resources, and improved user experience.

In some examples, the UE may request crowd-sourced data (e.g., from a network entity or a cloud-based server), or identify historical data, based on which the UE may generate (e.g., using the ML model) the predicted initial gain state. For example, the UE may access UE history data (e.g., from the short term or long term memory of the UE) associated with previous initial acquisition procedures performed by the UE in the same or nearby geographic areas. The UE may input the UE history data (e.g., as well as current UE status parameters such as velocity) into the ML model to generate a predicted gain state which may be more likely (e.g., than the default gain state) to result in a successful initial acquisition (e.g., without reattempting the initial acquisition procedure). In some examples (e.g., if there is no UE history data available), the UE may access crowdsourced data stored by a local network to input into the ML model. In some examples (e.g., if there is no local network data available), the UE may download crowdsourced data (e.g., from a cloud-based server) to input into the ML model. Utilizing the ML model and the crowd-sourced data may result in more efficient initial acquisition, reduced latency, and improved user experience.

Aspects of the disclosure are initially described in the context of wireless communications systems. Aspects of the disclosure are further illustrated and described by flow charts. Aspects of the disclosure are further illustrated by and described with reference to apparatus diagrams, system diagrams, and flowcharts that relate to efficient initial acquisition with gain state prediction using ML.

FIG. 1 shows an example of a wireless communications system 100 that supports efficient initial acquisition with gain state prediction using ML in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support efficient initial acquisition with gain state prediction using ML as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Techniques described herein may allow for a UE 115 to predict a gain state for an initial acquisition procedure with a network entity 105. For example, the UE 115 may use an ML model to predict an initial gain state which is likely to result in a successful initial acquisition procedure (e.g., without adjusting the gain state and reattempting the initial acquisition procedure). For example, the UE 115 may access UE history data (e.g., from the short term or long term memory of the UE 115) associated with previous initial acquisition procedures performed by the UE 115 in nearby geographic areas. The UE 115 may input the UE history data (e.g., as well as current UE status parameters such as velocity) into the ML model to generate a predicted gain state which may be more likely (e.g., than the default gain state) to result in a successful initial acquisition (e.g., without reattempting the initial acquisition procedure). In some examples (e.g., if there is no UE history data available), the UE 115 may access crowdsourced data stored by a local network to input into the ML model. In some examples (e.g., if there is no local network data available), the UE 115 may download crowdsourced data (e.g., from a cloud-based server) to input into the ML model. The UE 115 may use the initial gain state generated by the ML model to attempt an initial acquisition procedure with the network entity 105.

Figure 2:
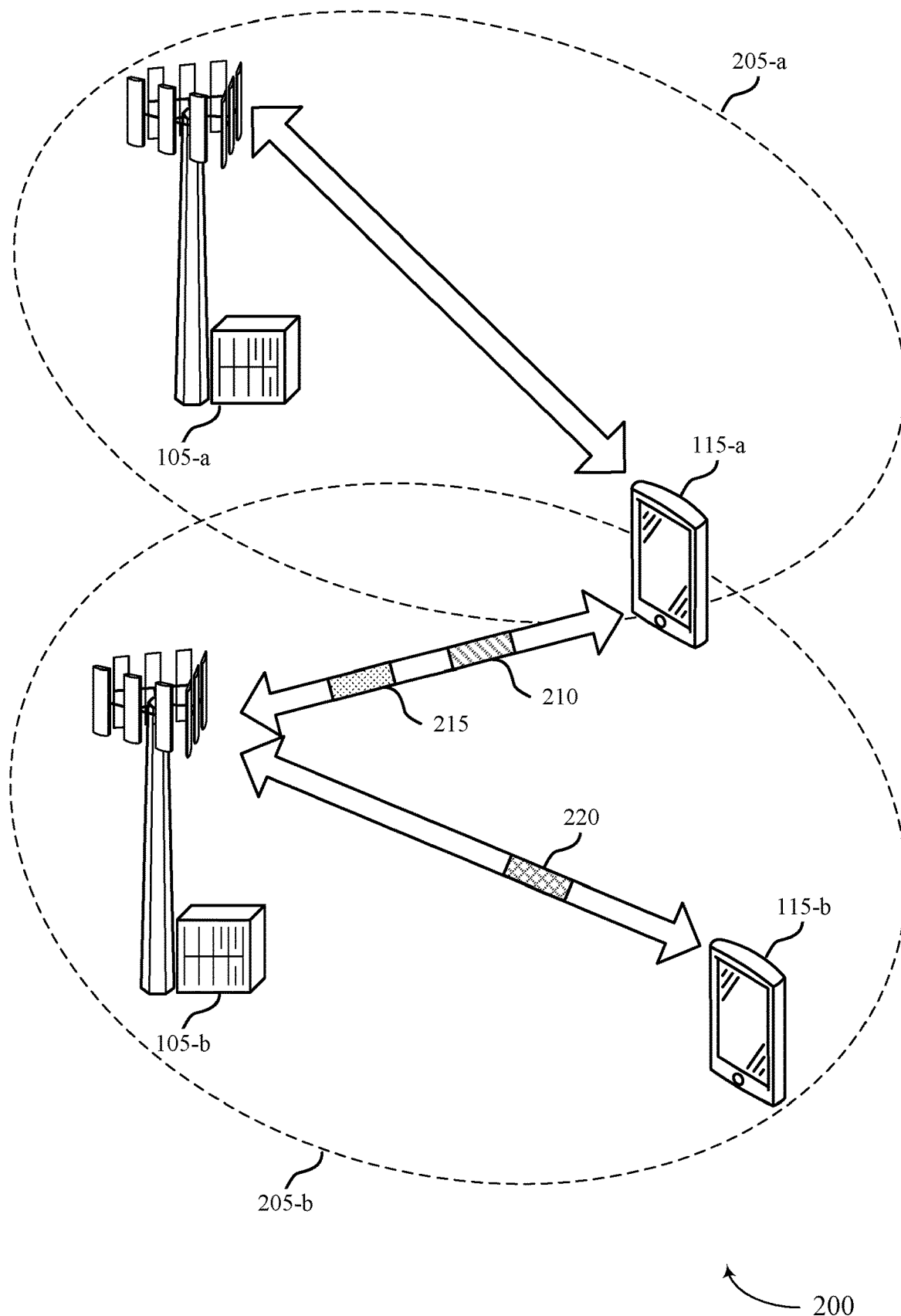
FIG. 2 shows an example of a wireless communications system that supports efficient initial acquisition with gain state prediction using ML in accordance with one or more aspects of the present disclosure.

FIG. 2 shows an example of a wireless communications system 200 that supports efficient initial acquisition with gain state prediction using ML in accordance with one or more aspects of the present disclosure. The wireless communications system 200 may implement aspects of or may be implemented by aspects of the wireless communications system 100. For example, the wireless communications system 200 may include one or more UEs 115 (e.g., a UE 115-*a* and a UE 115-*b*) and one or more network entities 105 (e.g., a network entity 105-*a* and a network entity 105-*b*), which may be examples of the corresponding devices as described with reference to FIG. 1.

In some wireless communications systems, a UE 115-*a* may perform an initial acquisition procedure to identify and establish communication with a network entity 105-*b*. For example, the UE 115-*a* may transition from communicating with a network entity 105-*a* to communicating with the network entity 105-*b* (e.g., as the UE 115-*a* moves from a coverage area 205-*a* of the network entity 105-*a* to a coverage area 205-*b* of the network entity 105-*b*). The UE 115-*a* may attempt the initial acquisition procedure using a default gain state (e.g., gain_state=2). In some cases, however, the default gain state may be inadequate (e.g., may be too high or too low for successful initial acquisition) and the initial acquisition procedure may be unsuccessful. For example, various factors (geographic location of the UE 115-*a*, distance from the network entity 105-*b*, provider of the network entity 105-*b*, etc.) may affect the power of signals received from the network entity 105-*b* and, as a result, a gain state higher or lower than the default gain state may be more likely to result in a successful initial acquisition procedure. In such cases, the UE 115-*a* may adjust the gain state (e.g., to gain_state=7) and reattempt the initial acquisition procedure, which may cause delays in initial acquisition.

For example, if the UE 115-*a* performs a shallow scan, the initial acquisition procedure may last for a first duration (e.g., 20 ms). If the initial acquisition procedure is unsuccessful, the UE 115-*a* may reattempt the procedure, which may last for an additional first duration (e.g., a total of 40 ms). If the UE 115-*a* performs a deep scan, the initial acquisition procedure may be repeated a quantity of times (e.g., four times during a non-coherency window and three times during a log likelihood ratio (LLR) combining process), and thus the scan may last for a second duration (e.g., 140 ms). If the initial acquisition procedures are unsuccessful, the UE 115-*a* may reattempt the deep scan, which may last for an additional second duration (e.g., 240 ms total). In any case, reattempting acquisition after failed initial acquisition procedures may result in increased delays, an increase in system latency, inefficient use of available resources, and decreased user experience.

Accordingly, techniques described herein may allow for the UE 115-*a* to predict a gain state for an initial acquisition procedure. For example, the UE 115-*a* may predict an area (e.g., a neighbor area) which the UE 115-*a* may travel to (e.g., based on a carrier or a geographic location of the UE 115-*a* determined via a global position system (GPS)). For instance, the UE 1115-*a* may travel from the coverage area to the 205-*a*, and may predict that it will soon enter the coverage area 205-*b* (e.g., based on its current trajectory, velocity, direction, historic data such as previous travel routes or patterns, among other examples). The UE 115-*a* may use an ML model (e.g., a built-in ML engine) to predict an initial gain state which is likely to result in a successful initial acquisition procedure in the predicted area (e.g., without adjusting the gain state and reattempting the initial acquisition procedure). For example, based on carrier and geographic location information (e.g., current parameter values), the UE 115-*a* may predict neighbor areas that the UE may travel to, and may predict an initial acquisition state for the predicted neighbor area, as described herein.

For example, the UE 115-*a* may input one or more parameters into the ML model to generate the initial gain state. The one or more parameters may include, for example, an absolute radio-frequency channel number (ARFCN), geolocation data, and current UE status parameters such as the location and velocity of the UE 115-*a*, a channel condition, etc. Additionally, the parameters may include data related to an initial gain state used by the UE 115-*a* or other UEs 115 for a successful initial acquisitor procedure (e.g., in the geolocation and ARFCN of the UE 115-*a* or across geolocations and carriers). The ML engine may input the parameters into one or more algorithms to generate a predicted gain state for the UE 115-*a* to use in an initial acquisition procedure (e.g., for a shallow scan, a deep scan, etc.). For instance, the UE 115-*a* may generate its own current values for one or more parameters (e.g., location, velocity, channel conditions, etc.), and may input the current parameter values into the ML engine. The ML engine may utilize historical data (e.g., previous initial gain states for the UE 115-*a* in the same or similar locations), or crowdsourced data (e.g., data from other UEs 115 under conditions corresponding to the current parameter values for the UE 115-*a*) from a network server or a cloud-based server to generate a predicted initial gain state for the current parameter values of the UE 115-*a* (e.g., the ML engine may generate a predicted gain state for the UE in its current conditions, based on crowd-sourced data from other UEs, and successful gain states for the other UEs when operating under one or more of the same conditions as the UE 115-*a*).

As described herein, a UE 115-*a* may check history data first. If a particular ARFCN data is not available, the UE 115-*a* may check data set from a local network for the ARFCN. If not found, the UE 115-*a* may automatically download a data set (e.g., via cellular, Wi-Fi, applications, or a combination thereof) for current or neighboring locations, from a cloud-based server. Such data may be refreshed periodically (e.g., weekly) by the UE 115-*a*.

For example, the UE 115-*a* may access UE history data (e.g., from the short term or long term memory of the UE 115-*a*) associated with previous initial acquisition procedures performed by the UE 115-*a* in nearby geographic areas in the ARFCN (e.g., in the coverage area 205-*a* with the network entity 105-*a* or in the coverage area 205-*b* with the network entity 105-*b* at a previous time). The UE 115-*a* may input the UE history data (e.g., as well as the current UE status parameters such as location, velocity, etc.) into the ML model to generate a predicted gain state which may be more likely (e.g., than the default gain state) to result in a successful initial acquisition without reattempting the initial acquisition procedure. For example, the default gain state may have a first success rate (e.g., 72.76%) and the predicted gain state may have a second success rate (e.g., 89.1%) which may be higher than the first success rate (e.g., 16.34% higher).

In some examples (e.g., if there is no UE history data available for the ARFCN, geolocation, etc.), the UE 115-*a* may access crowdsourced data collected and stored by a local neighborhood network to input into the ML model. The local neighborhood network may include one or more devices (e.g., the network entity 105-*b* and a UE 115-*b*) that have successfully performed an initial acquisition procedure (e.g., the UE 115-*b* and the network entity 105-*b*). For example, the UE 115-*b* may have previously performed a successful initial acquisition procedure with the network entity 105-*b* and may have accordingly transmitted a report 220 to the network entity 105-*b* (e.g., to a network server or a cloud-based server) including data associated with the successful initial acquisition procedure (e.g., UE status parameters and the initial gain state used in the successful initial acquisition procedure). The UE 115-*a* may transmit a request 210 to the network entity 105-*b* for the crowdsourced data (e.g., associated with the geolocation, ARFCN, and current UE status parameters). The network entity 105-*b* may accordingly identify relevant crowdsourced data (e.g., parameters associated with a successful initial acquisition procedure reported by the UE 115-*b* including a gain state used by the UE 115-*b* under similar conditions as experienced by the UE 115-*a*) and transmit the requested data in a information 215 (e.g., crowd-sourced data, including one or more parameter values) to the UE 115-*a*. In such examples, the UE 115-*a* may input the crowdsourced data (e.g., including the gain state used by the UE 115-*b*) and the current UE status parameters into the ML model to generate the predicted gain state.

In some examples (e.g., if there is no UE history data or crowdsourced local network data available), the UE 115-*a* may download crowdsourced data (e.g., may request and download information 215 from a cloud-based server) to input into the ML model. The cloud-based server may be, for example, a framework for collecting and storing data related to a gain state used for initial acquisition by many UEs 115 (e.g., across carriers and geographic locations). The UE 115-*a* may, in some examples, download the crowdsourced data for the geographic location of the UE 115-*a* and neighboring locations automatically (e.g., via cellular, wireless fidelity (Wi-Fi), or an application at the UE 115-*a*) by transmitting a request 210 to the network entity 105-*b*. The network entity 105-*a* may accordingly transmit information 215 to the UE 115-*a* including the requested data. The UE 115-*a* may download updated crowdsourced data from the cloud-based server (e.g., refresh the crowdsourced data) periodically (e.g., daily, weekly, among other examples).

The UE 115-*a* may input the crowdsourced data and the current UE status parameters into the ML model to generate the predicted gain state. In some examples (e.g., if the UE 115-*a* is camping on the network for the first time, if the UE 115-*a* has not performed a past initial acquisition procedure with the network entity 105-*b*, or if the UE 115-*a* does not have access to the crowdsourced data), the UE 115-*b* may not download the crowdsourced data and may instead use the default gain state.

The UE 115-*a* may use the gain state generated by the ML model to attempt an initial acquisition procedure with the network entity 105-*b*. If the initial acquisition procedure is unsuccessful (e.g., the gain setting is improper), the UE 115-*a* may adjust the gain state and reattempt the initial acquisition procedure. If the UE 115-*a* completes a successful initial acquisition procedure, the UE 115-*a* may collect and maintain data related to the initial acquisition procedure (e.g., including the gain state and UE status parameters) in some or all of the short or long-term memory of the UE 115-*a*, in the local neighborhood network, and in the cloud-based server. The cloud-based server and the local neighborhood network may additionally collect statistic information (e.g., related to successful initial acquisition procedures reported from thousands or millions of UEs 115 across carries and geographic locations such as countries) and local neighborhood data, respectively (e.g., may collect reports 220 from thousands or millions of UEs 115). For example, a local network may collect local neighborhood data, and the UE 115-*a* may collect and maintain the history data. Accordingly, the data (e.g., the UE history data and the crowdsourced data) may become more accurate at a given geographical location as more UEs 115 perform a successful initial acquisition procedure, which may allow the UEs 115 to more accurately estimate a gain state (e.g., or received signal strength indicator (RSSI) via the on-device ML engine for a given carrier or geolocation (e.g., determined via GPS))

The UE 115-*a* may perform one or more iterations of techniques described herein. In some examples, once location data (e.g., from a GPS) is accurate enough (e.g., satisfies a threshold), more accurate estimation of gain state, RSSI, or the like, may be derived based on the on-device ML engine for a carrier at each geo location.

Although these techniques are described herein with reference to an initial acquisition procedure, the techniques may be used for other applications (e.g., determining an initial gain state for radio link failure (RLF) recovery acquisition and public land mobile network (PLMN) scans).

Figure 3:
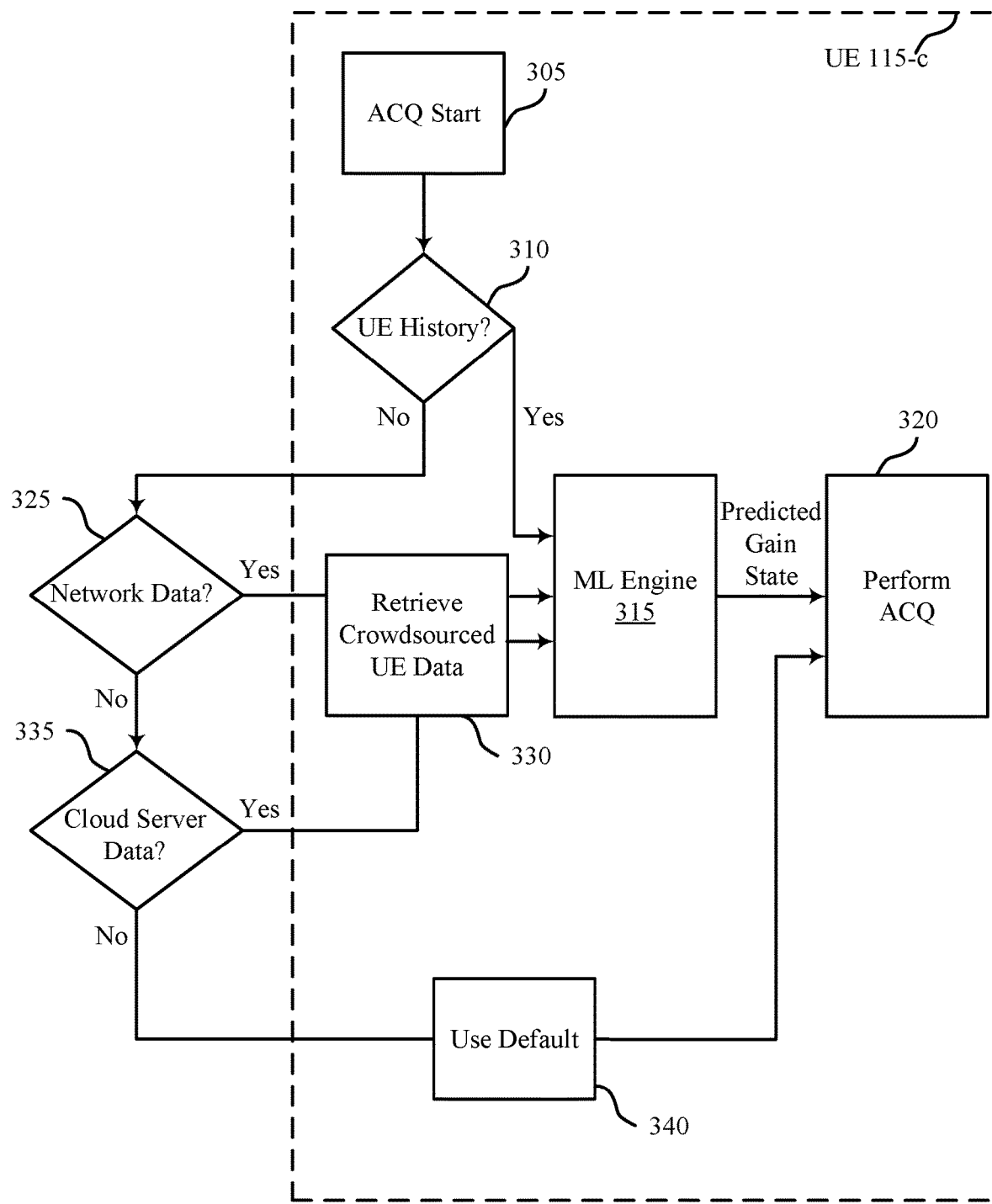
FIG. 3 shows an example of a flow chart that supports efficient initial acquisition with gain state prediction using ML in accordance with one or more aspects of the present disclosure.

FIG. 3 shows an example of a flow chart 300 that supports efficient initial acquisition with gain state prediction using ML in accordance with one or more aspects of the present disclosure. The flow chart 300 may implement aspects of or may be implemented by aspects of the wireless communications system 100 or the wireless communications system 200. For example, the flow chart 300 may include one or more UEs 115 (e.g., a UE 115-*c*) and one or more network entities 105, which may be examples of the corresponding devices as described with reference to FIG. 1.

The UE 115-*c* may identify (e.g., receive from a network entity 105) an indication of a default value for an initial gain state to use in an initial acquisition (ACQ) procedure. At 305, the UE 115-*c* may start the initial ACQ procedure. For example, the UE 115-*c* may start an initial ACQ procedure for one or more of a deep ACQ scan, a shallow ACQ scan, an RLF ACQ scan, and a PLMN ACQ scan.

At 310, the UE 115-*c* may determine if the UE 115-*c* has access to historical values for a set of input parameters for an ML model at the UE 115-c. The ML model may be an ML model for predicting an initial gain state for the UE 115-c to use in the initial ACQ procedure. The UE 115-c may determine if the historical values are stored in the short or long term memory of the UE 115-c.

If the UE 115-c determines that the UE 115-c has the historical values, the UE 115-c may apply the historical values to the ML model. For example, the UE 115-c may provide values of input parameters to the ML engine 315. The values of the input parameters may be current values describing a current status of the UE 115-c and may include one or more of a location parameter, a mobility information parameter, a gain state information parameter, a channel state information (CSI) parameter, and a cyclic redundancy check (CRC) parameter, among other examples. The values of the input parameters may include the historical values. The UE 115-c may generate a predicted value for an initial gain state via the ML model (e.g., use a gain state set to 2, 7, etc., when performing initial acquisition).

At 320, the UE 115-c may perform the initial ACQ procedure using the predicted value for the initial gain state. The predicted value for the initial gain state may be different from the default value for the initial gain state. The UE 115-c may select the predicted value rather than using the default value for the initial gain state based on inputting the historical values into the ML engine 315.

At 325, if the UE 115-c does not have access to the historical values, the UE 115-c may determine if the UE 115-c has access to crowdsourced UE data (e.g., crowdsourced values) from a network server. For example, the UE 115-c may transmit a request to the network server for the crowdsourced values.

At 330, the UE 115-c may retrieve the crowdsourced values. For example, the UE 115-c may receive the crowdsourced values (e.g., local neighbor data related to a geographic location of the UE 115-c) from the network server in response to the request. The crowdsourced values may include multiple sets of aggregated values for the input parameters received by the network server from one or both of multiple UEs 115 and multiple network entities 105 which are in a network with the network server. The UE 115-c may collect and store the crowdsourced values in local data history information.

If the UE 115-c retrieves the crowdsourced values, the UE 115-c may apply the ML model as described with reference to FIG. 3 (e.g., the UE 115-c may input the retrieved crowdsourced UE data corresponding to the current parameters at the UE 115-c into the ML engine 315). The values of the input parameters may include the crowdsourced values. The UE 115-c may generate the predicated value for the initial gain state via the ML model. The UE 115-c may perform the initial ACQ procedure as described with reference to step 320.

At 335, if the UE 115-c determines that the UE 115-c does not have access to the crowdsourced values from the neighborhood network, the UE 115-c may determine if the UE 115-c has access to crowdsourced values from a cloud-based server. For example, the UE 115-c may transmit a request for the crowdsourced values to the cloud-based server.

If the UE 115-c has access to the crowdsourced values (e.g., the cloud-based server data) from the cloud-based server, at 330, the UE 115-c may retrieve the crowdsourced values. For example, the UE 115-c may download the crowdsourced values from the cloud-based server in response to the request. The crowdsourced values may include multiple sets of aggregated values for the input parameters from multiple UEs 115 (e.g., across carries and geographic locations). For example, the crowdsourced values may include ARFCH data, location data, Gain_State data, RSSI, a physical broadcast channel CRC status (PBCH_CRC_status), or any combination thereof.

If the UE 115-c retrieves the crowdsourced values, the UE 115-c may apply the ML model as described with reference to step 315. The values of the input parameters may include the crowdsourced values. The UE 115-c may generate the predicated value for the initial gain state via the ML model. The UE 115-c may perform the initial ACQ procedure as described with reference to step 320.

At 340, if the UE 115-c determines that the UE 115-c does not have access to the crowdsourced values from the cloud-based server, the UE 115-c may determine to use the default gain state. That is, the UE 115-c may perform the initial ACQ procedure as described with reference to step 320 using the default gain state.

The UE 115-c may transmit an initial ACQ report to one or both of the cloud-based server and the network server. For example, the UE 115-c may transmit a report including an indication of the values for the input parameters. The report may additionally include an indication of whether the UE 115-c performed a successful initial ACQ procedure.

In some examples, the UE 115-c may perform the initial ACQ procedure with a first operator via a first subscriber identity module (SIM), and with a second operator via a second SIM (e.g., in a multi-SIM (MSIM) scenario). The values for the input parameters may include a first subset of values (e.g., current values, historical values, and/or crowdsourced values) for the first subscriber identity module and a second subset of values (e.g., current values, historical values, and/or crowdsourced values) for the second subscriber identity module.

Figure 4:
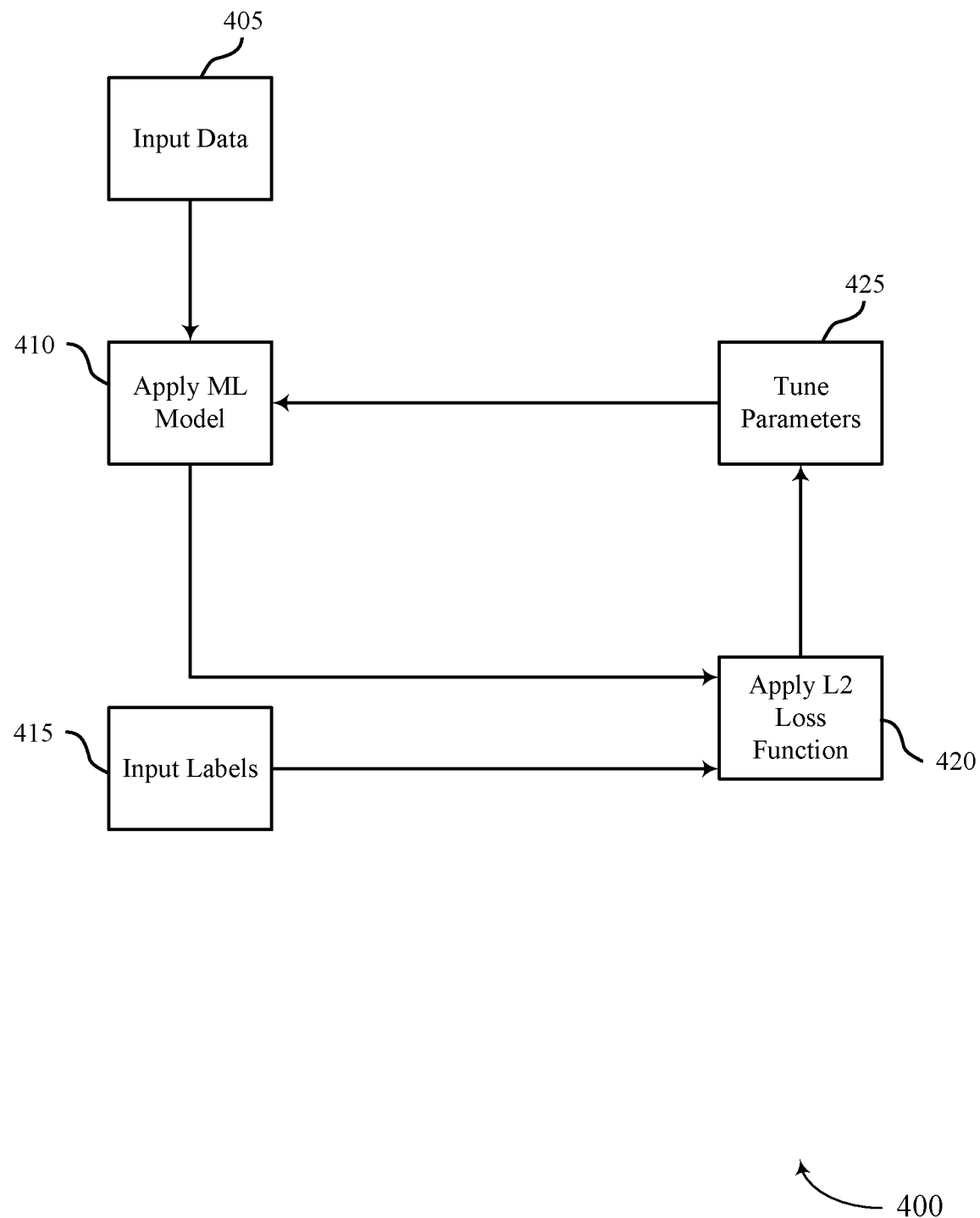
FIG. 4 shows an example of an ML engine that supports efficient initial acquisition with gain state prediction using ML in accordance with one or more aspects of the present disclosure.

FIG. 4 shows an example of an ML engine 400 that supports efficient initial acquisition with gain state prediction using ML in accordance with one or more aspects of the present disclosure. The ML engine 400 may implement aspects of or may be implemented by aspects of the wireless communications system 100, the wireless communications system 200, or the flow chart 300. For example, the ML engine 400 may be an example of the ML engine 315 described with reference to FIG. 3, which may be included in or utilized by one or more UEs 115, which may be examples of the corresponding devices as described with reference to FIG. 1. The processes described within the ML engine 400 may be examples of applying an ML model as described with reference to FIG. 3.

At 405, a UE 115 may input data into the ML engine 400. For example, the UE 115 may input parameters including one or more of historical values, crowdsourced values, and current values describing a current status of the UE 115 into the ML engine 400, as described in greater detail with reference to FIG. 3.

At 410, the UE 115 may apply an ML model (e.g., a decision forest with gradient boosting trees) according to the input data. In some examples, at 410, the UE 115 may apply a neural network (NN) (e.g., a long short-term memory (LSTM) network or a convolution NN (CNN)) using the data. In some examples, at 410, the UE 115 may apply other ML models or NNs. The ML model or NN may output a predicted gain state for the UE 115 to use in an initial acquisition procedure. Application of the ML model may include one or more features (e.g., one or more parameter values corresponding to the input data) such as crowdsourced ARFCN, UE geolocation information, or the like.

At 415, the UE 115 may input labels (e.g., classifications) into the ML engine 400. For example, the UE 115 may input two or more labels describing possible initial gain states (e.g., gain_state=2 or gain_state=7) for the UE 115 to use in the initial acquisition procedure into the ML engine 400. The ML model may then approach the input data and the selection of the predicted gain state as a classification problem of the possible initial gain states.

At 420, the UE 115 may apply a function (e.g., a squared error (L2) loss function) and calculate a mean absolute error (MAE). The UE 115 may apply the function using the input labels and the output of the ML model or NN.

At 425, the UE 115 may tune the parameters (e.g., based on the calculated MAE). For instance, the UE 115 may tune or update one or more coefficients for crowdsourced data compared with the predicted initial gain state. The UE 115 may input the tuned parameters into the ML model or the NN to generate a new output, as described with reference to step 410. The UE 115 may input the new output into the function to generate a new MAE.

The UE 115 may perform one or more iterations of applying the ML model (e.g., or the NN), applying the function, and tuning the parameters as described herein. The ML engine 400 may output a predicted initial gain state (e.g., gain_state=2 or gain_state=7) for the UE 115 to use in the initial acquisition procedure. The UE 115 may perform the initial acquisition procedure with the predicated initial gain state as described with reference to FIG. 3.

Figure 5:
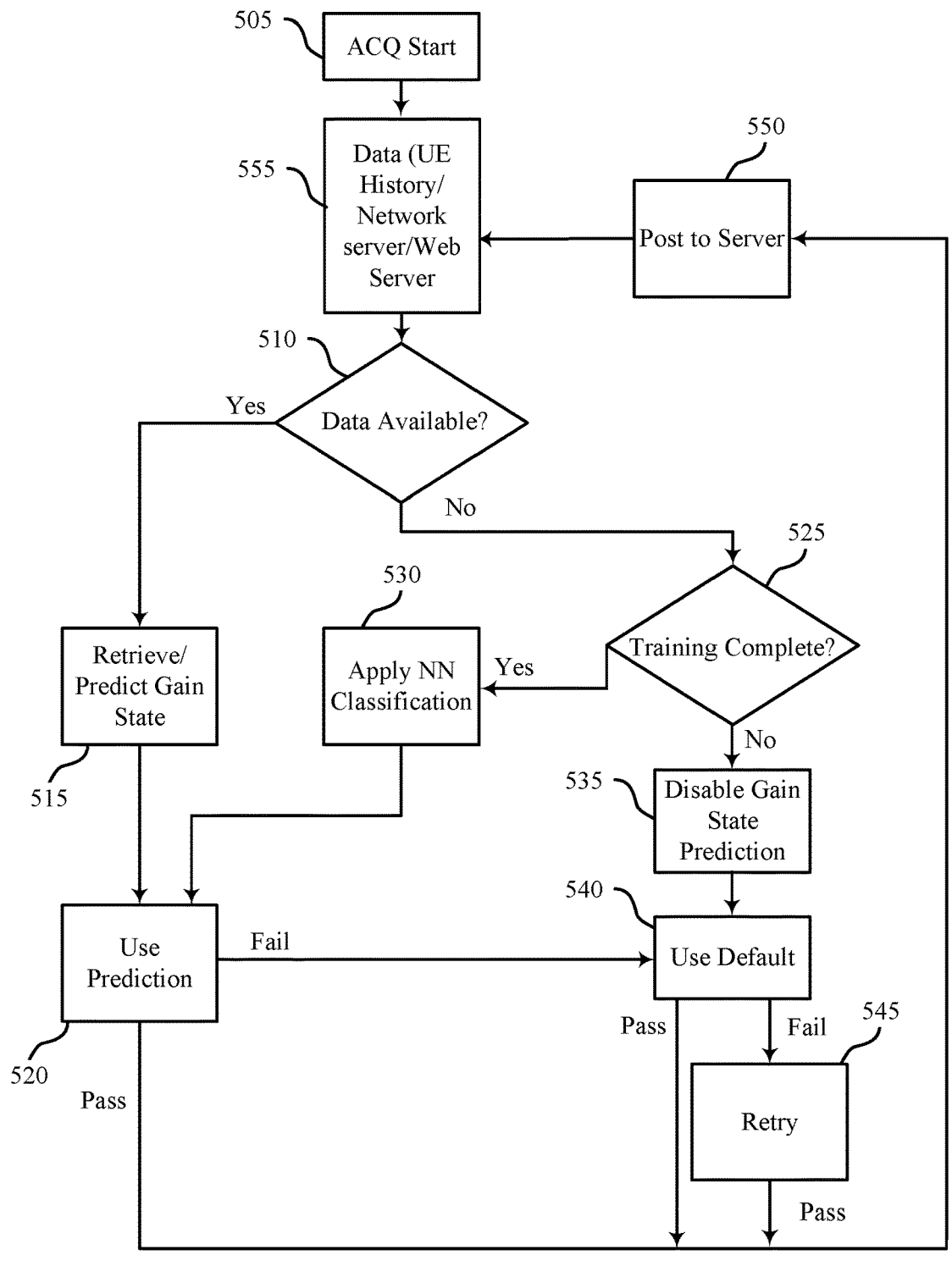
FIG. 5 shows an example of an algorithmic flow chart that supports efficient initial acquisition with gain state prediction using ML in accordance with one or more aspects of the present disclosure.

FIG. 5 shows an example of an algorithmic flow chart 500 that supports efficient initial acquisition with gain state prediction using ML in accordance with one or more aspects of the present disclosure. The algorithmic flow chart 500 may implement aspects of or may be implemented by aspects of the wireless communications system 100 or the wireless communications system 200. For example, the algorithmic flow chart 500 may be performed by one or more UEs 115 and one or more network entities 105, which may be examples of the corresponding devices as described with reference to FIG. 1.

A UE 115 may receive an indication of a default value for an initial gain state to use in an initial ACQ procedure with a cell. At 505, the UE 115 may start the initial ACQ procedure. For example, the UE 115 may start an initial ACQ procedure for one or more of a deep ACQ scan, a shallow ACQ scan, a RLF ACQ scan, and a PLMN ACQ scan.

At 510, the UE 115 may determine if data related to the initial ACQ procedure is available. For example, the UE 115 may determine if the UE 115 has access to historical data or crowdsourced data including an initial gain state used by the UE 115 (e.g., or other UEs 115) for an initial ACQ procedure with the cell (e.g., in the same geographical location or for the same ARFCN). For example, the UE 115 may look for UE historical data for the ARFCN and geolocation (e.g., at 555). If the UE 115 determines that it does not have a data match for the cell, ARFCN, and geolocation, the UE 115 may determine if the UE 115 has access to local neighborhood data collected by a neighborhood network for the ARFCN and geolocation. If the UE 115 determines that it does not have access to local neighborhood data, the UE 115 may determine if it has access to crowdsourced data stored in a cloud-based server (e.g., a web server). That is, the algorithm described herein may initially try to match for ARFCN in UE historic data. If the data is not available, then it will match ARFCN in neighboring network data. Again, if the data is not available, the nit will lookup from the web server (e.g., the cloud-based server), as described in greater detail with reference to FIG. 3.

At 515, if the UE 115 determines that the UE 115 has access to the historical data or crowdsourced data, the UE 115 may use the historical data or the crowdsourced data to retrieve or predict an initial gain state for the UE 115 to use for the initial ACQ procedure. For example, if the UE 115 finds historical or crowdsourced data which matches the geolocation and ARFCN of the UE 115, the UE 115 may retrieve the initial gain state used by the UE 115 (e.g., or other UEs 115) and reuse the initial gain state for the initial ACQ procedure with the cell. For instance, if a match is found for a given cell, AFRCN, and location of the UE 115, the UE 115 may reuse this gain state for initial acquisition. If no match is found, the UE will check if the neural network or decision forest classification can be applied by checking if training is complete (e.g., at 525). In some examples, the UE 115 may input the historical or crowdsourced data (e.g., and current UE status parameters) into an ML model or NN (a decision forest, LSTM, CNN, etc.) as described with reference to FIG. 3 to predict the initial gain state.

At 520, the UE 115 may use the retrieved or predicted initial gain state to attempt the initial ACQ procedure. If the initial ACQ procedure is successful, the UE 115 may save data including the retrieved or predicted initial gain state as historical data and may post the data including the retrieved or predicted initial gain state to a server (e.g., a network server or a cloud-based server) for the UE 115 and other UEs 115 to use in a future initial gain state prediction. If the initial ACQ procedure is unsuccessful, the UE 115 may adjust the initial gain state and reattempt the initial ACQ procedure. For example, the UE 115 may reattempt the initial ACQ procedure using the default value for the initial gain state.

At 525, if the UE 115 determines that the UE 115 does not have access to the historical data or the crowdsourced data, the UE 115 may determine if NN or ML model classification may be used by determining if training of the ML model or NN is complete. For example, the UE 115 may determine if a first training threshold for the ML model or NN is met (e.g., the model may be enabled only if a certain training threshold is met). The training threshold may be configurable. For example, the UE 115 may receive a configuration of the first training threshold (e.g., from a network entity).

If a second training threshold is met, the UE 115 may retrain the ML model or NN (e.g., to prevent overfitting). The model may be retrained after another threshold is hit to ensure the model does not overfit a current call flow or channel conditions. For example, if the UE 115 trains the ML model or NN with a first call flow or channel condition past the second training threshold, the ML model or NN may be less effective in predicting an initial gain state for a second call flow or channel condition. The UE 115 may receive a configuration of the second training threshold (e.g., from the network entity).

If the UE 115 determines that the first training threshold is met, at 530, the UE 115 may apply (e.g., enable) the ML model or NN. That is, the UE 115 may perform a classification calculation with the ML model or NN to predict the initial gain state for the UE 115 to use in the initial ACQ procedure. The UE 115 may attempt the initial ACQ procedure using the initial gain state as described with reference to step 520.

If the UE 115 determines that the first training threshold is not met, at 535, the UE 115 may disable gain state prediction and refrain from applying the ML model or NN. At 540, the UE 115 may attempt the initial ACQ procedure using the default value for the initial gain state. If the initial ACQ procedure is unsuccessful, at 545, the UE 115 may adjust the initial gain state and reattempt the initial ACQ procedure.

If the UE 115 performs a successful initial ACQ procedure, at 550, the UE 115 may save data (e.g., including initial gain state used in the successful initial ACQ procedure) as historical data. The UE 115 may post the data including the retrieved or predicted initial gain state to a server (e.g., the UE 115 may trigger a post event to the network server or the cloud-based server) for the UE 115 and other UEs 115 to use in a future initial gain state prediction. The saved data (as historical data, or posted to the cloud-based server, or provided to the network server) may be made available or future iterations (e.g., checked at 555 to determine at 510 whether the data is available). For example, successful acquisition with a new gain state value may serve as a post event to the web server (e.g., may trigger posting of the successful acquisition and corresponding conditions and parameter values such as AFCRN, geolocation, channel conditions, RSSI, PBCH CRC status, gain state, etc.) for other UEs 115 to leverage (e.g., for future initial acquisition procedures by other UEs using crowdsourced data and a ML engine).

Figure 6:
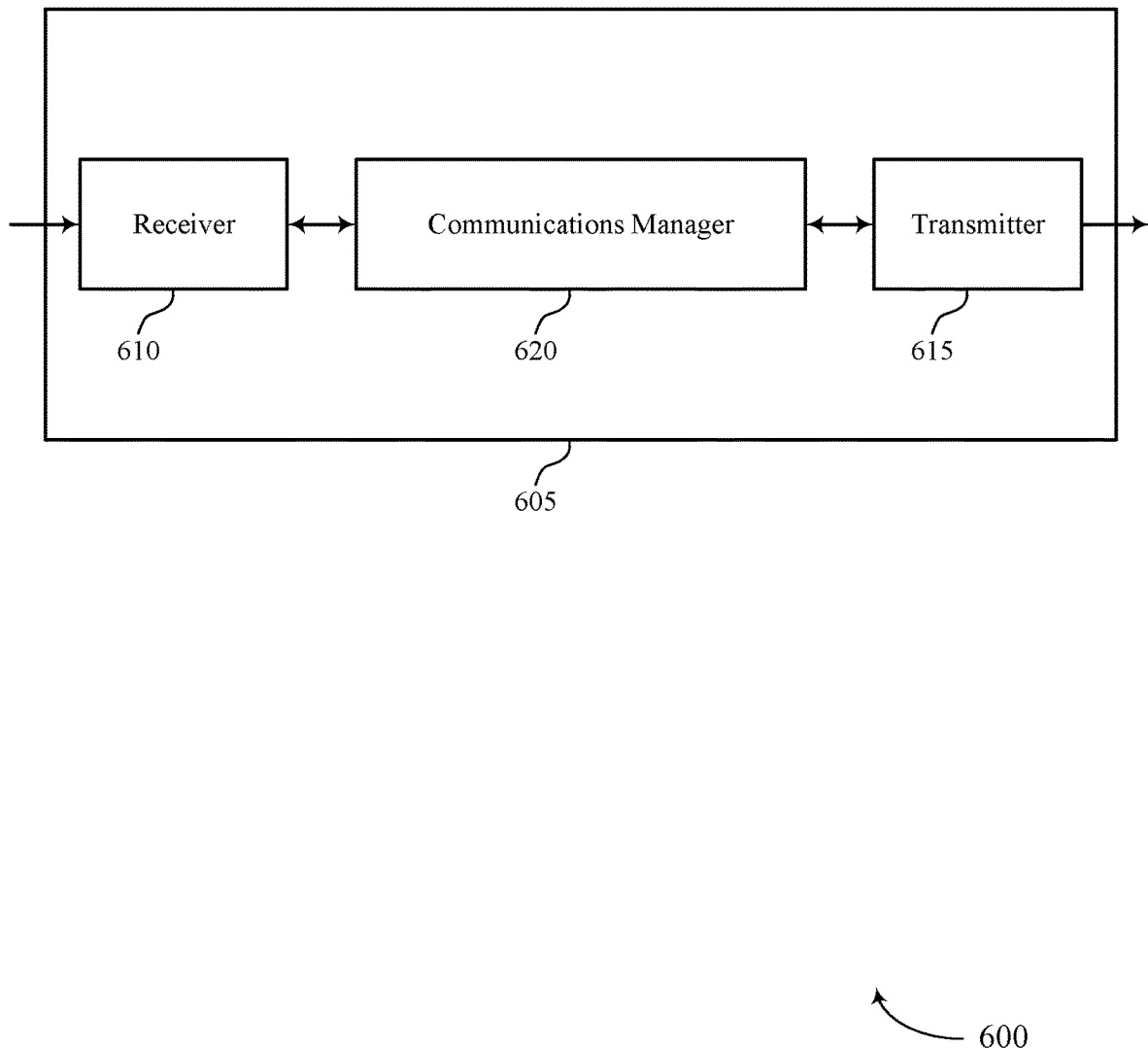
FIGS. 6 and 7 show block diagrams of devices that support efficient initial acquisition with gain state prediction using ML in accordance with one or more aspects of the present disclosure.

FIG. 6 shows a block diagram 600 of a device 605 that supports efficient initial acquisition with gain state prediction using ML in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to efficient initial acquisition with gain state prediction using machine learning). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to efficient initial acquisition with gain state prediction using machine learning). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of efficient initial acquisition with gain state prediction using machine learning as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 is capable of, configured to, or operable to support a means for providing a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE. The communications manager 620 is capable of, configured to, or operable to support a means for generating, by the machine learning model and based on the set of multiple values for the set of multiple input parameters, a predicted value for an initial gain state. The communications manager 620 is capable of, configured to, or operable to support a means for performing an initial acquisition procedure with a network entity according to the predicted value for the initial gain state.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for a UE to predict a gain state to use in an initial acquisition procedure, which may result in reduced latency.

Figure 7:
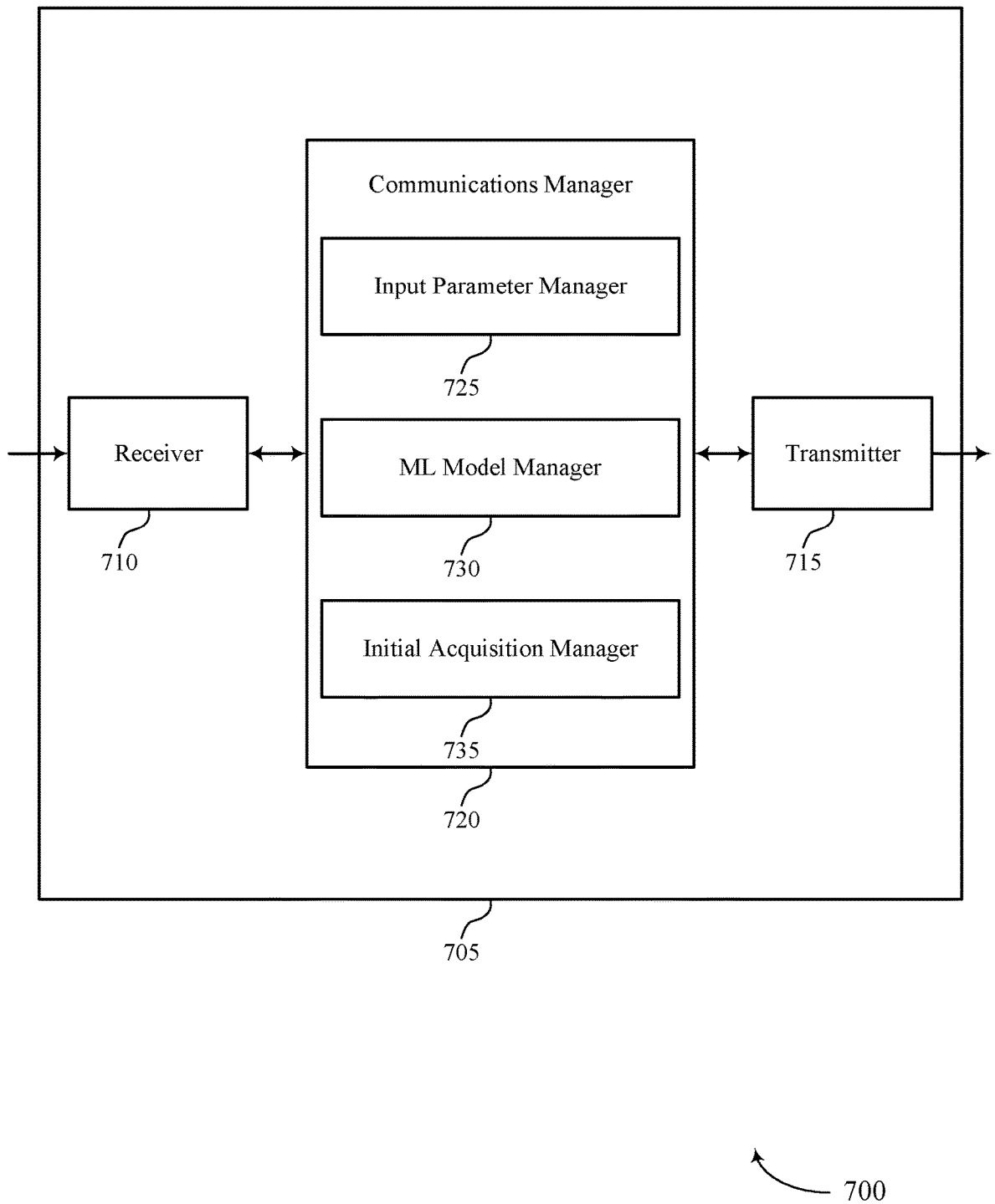

FIG. 7 shows a block diagram 700 of a device 705 that supports efficient initial acquisition with gain state prediction using machine learning in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to efficient initial acquisition with gain state prediction using machine learning). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to efficient initial acquisition with gain state prediction using machine learning). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of efficient initial acquisition with gain state prediction using machine learning as described herein. For example, the communications manager 720 may include an input parameter manager 725, an ML model manager 730, an initial acquisition manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The input parameter manager 725 is capable of, configured to, or operable to support a means for providing a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE. The ML model manager 730 is capable of, configured to, or operable to support a means for generating, by the machine learning model and based on the set of multiple values for the set of multiple input parameters, a predicted value for an initial gain state. The initial acquisition manager 735 is capable of, configured to, or operable to support a means for performing an initial acquisition procedure with a network entity according to the predicted value for the initial gain state.

Figure 8:
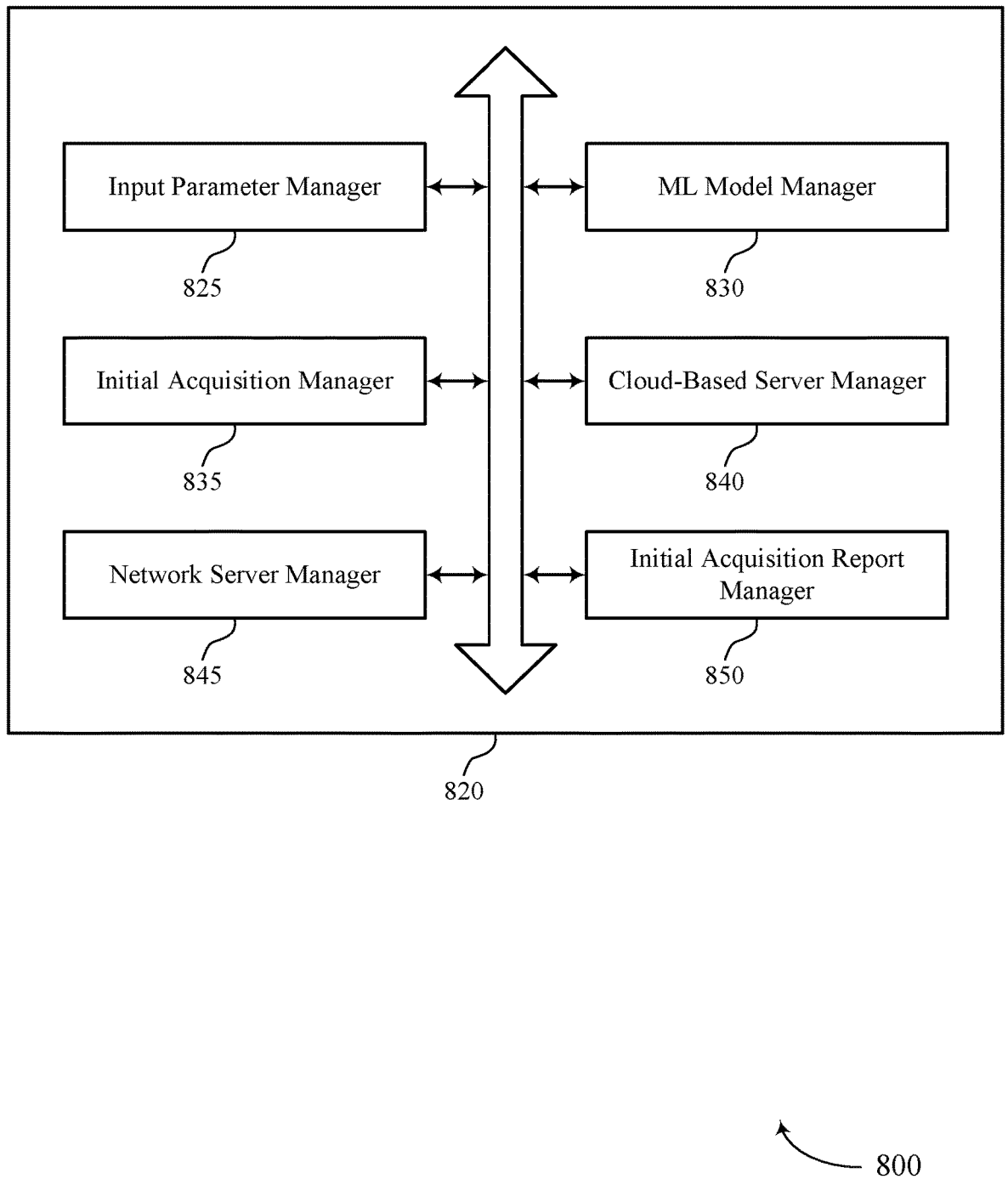
FIG. 8 shows a block diagram of a communications manager that supports efficient initial acquisition with gain state prediction using ML in accordance with one or more aspects of the present disclosure.

FIG. 8 shows a block diagram 800 of a communications manager 820 that supports efficient initial acquisition with gain state prediction using machine learning in accordance with one or more aspects of the present disclosure. The communications manager 820 may be an example of aspects of a communications manager 620, a communications manager 720, or both, as described herein. The communications manager 820, or various components thereof, may be an example of means for performing various aspects of efficient initial acquisition with gain state prediction using machine learning as described herein. For example, the communications manager 820 may include an input parameter manager 825, an ML model manager 830, an initial acquisition manager 835, a cloud-based server manager 840, a network server manager 845, an initial acquisition report manager 850, or any combination thereof. Each of these components may communicate, directly or indirectly, with one another (e.g., via one or more buses).

The communications manager 820 may support wireless communications at a UE in accordance with examples as disclosed herein. The input parameter manager 825 is capable of, configured to, or operable to support a means for providing a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE. The ML model manager 830 is capable of, configured to, or operable to support a means for generating, by the machine learning model and based on the set of multiple values for the set of multiple input parameters, a predicted value for an initial gain state. The initial acquisition manager 835 is capable of, configured to, or operable to support a means for performing an initial acquisition procedure with a network entity according to the predicted value for the initial gain state.

In some examples, the cloud-based server manager 840 is capable of, configured to, or operable to support a means for transmitting, to a cloud-based server, a request for the crowdsourced values for the set of multiple input parameters. In some examples, the input parameter manager 825 is capable of, configured to, or operable to support a means for receiving, from the cloud-based server based on transmitting the request, the crowdsourced values for the set of multiple input parameters associated with the current status of the UE, the crowdsourced values including multiple sets of aggregated values for the set of multiple input parameters provided to the cloud-based server by a set of multiple UEs, where providing the set of multiple values is based on receiving the crowdsourced values from the cloud-based server.

In some examples, the network server manager 845 is capable of, configured to, or operable to support a means for transmitting, to a network server, a request for the crowdsourced values for the set of multiple input parameters. In some examples, the input parameter manager 825 is capable of, configured to, or operable to support a means for receiving, from the network server based on transmitting the request, the crowdsourced values for the set of multiple input parameters associated with the current status of the UE, the crowdsourced values including multiple sets of aggregated values for the set of multiple input parameters shared between a set of multiple UEs associated with the network server, a set of multiple network entities associated with the network server, or a combination thereof, where providing the set of multiple values is based on receiving the crowdsourced values from the network server.

In some examples, the network server manager 845 is capable of, configured to, or operable to support a means for receiving, from the network server based on transmitting the request, local neighbor data. In some examples, the input parameter manager 825 is capable of, configured to, or operable to support a means for collecting the local neighbor data in local data history information.

In some examples, the input parameter manager 825 is capable of, configured to, or operable to support a means for accessing the historical values for the set of multiple input parameters associated with the current status of the UE via a short term memory or a long term memory at the UE, where providing the set of multiple values is based on accessing the historical values.

In some examples, to support performing the initial acquisition procedure, the initial acquisition manager 835 is capable of, configured to, or operable to support a means for performing initial acquisition with a first operator via a first subscriber identity module. In some examples, to support performing the initial acquisition procedure, the initial acquisition manager 835 is capable of, configured to, or operable to support a means for performing initial acquisition with a second operator via a second subscriber identity module, where the current values for the set of multiple input parameters associated with a current status of the UE include a first subset of current values associated with the first subscriber identity module and a second subset of current values associated with the second subscriber identity module, and where the historical values or the crowdsourced values includes a first subset of historical values or crowdsourced values associated with the first subscriber identity module and a second subset of the historical values or crowdsourced values associated with the second subscriber identity module.

In some examples, the initial acquisition procedure is associated with a deep acquisition scan, a shallow acquisition scan, a radio link failure acquisition scan, a public land mobile network acquisition scan, or any combination thereof.

In some examples, the initial acquisition report manager 850 is capable of, configured to, or operable to support a means for transmitting an initial acquisition report to a cloud-based server, a network server, or both, the initial acquisition report including an indication of the set of multiple values for the set of multiple input parameters and an indication of whether the initial acquisition procedure was successful.

In some examples, the initial acquisition manager 835 is capable of, configured to, or operable to support a means for receiving an indication of a default value for the initial gain state that is different than the predicted value for the initial gain state. In some examples, the initial acquisition manager 835 is capable of, configured to, or operable to support a means for selecting, from the default value and the predicted value, the predicted value for the initial gain state based on generating the predicted value for the initial gain state by the machine learning model.

In some examples, the set of multiple input parameters includes one or more of a location parameter, a mobility information parameter, a gain state information parameter, a channel state information parameter, a cyclic redundancy check parameter, or any combination thereof.

Figure 9:
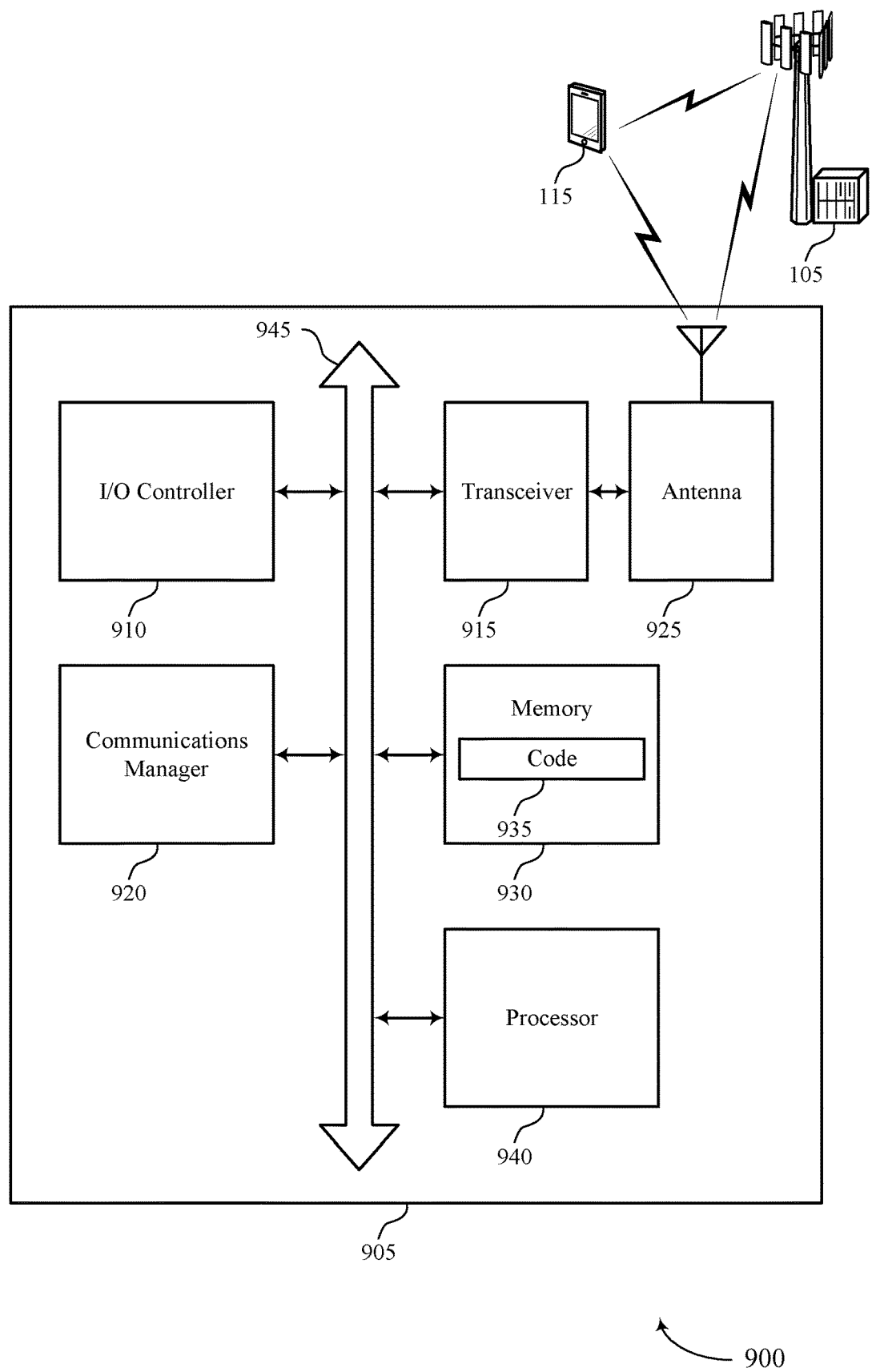
FIG. 9 shows a diagram of a system including a device that supports efficient initial acquisition with gain state prediction using ML in accordance with one or more aspects of the present disclosure.

FIG. 9 shows a diagram of a system 900 including a device 905 that supports efficient initial acquisition with gain state prediction using machine learning in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting efficient initial acquisition with gain state prediction using machine learning). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 is capable of, configured to, or operable to support a means for providing a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE. The communications manager 920 is capable of, configured to, or operable to support a means for generating, by the machine learning model and based on the set of multiple values for the set of multiple input parameters, a predicted value for an initial gain state. The communications manager 920 is capable of, configured to, or operable to support a means for performing an initial acquisition procedure with a network entity according to the predicted value for the initial gain state.

By including or configuring the communications manager 920 in accordance with examples as described herein, the device 905 may support techniques for a UE to predict a gain state to use in an initial acquisition procedure, which may result in improves user experience related to reduced latency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of efficient initial acquisition with gain state prediction using machine learning as described herein, or the processor 940 and the memory 930 may be otherwise configured to perform or support such operations.

Figure 10:
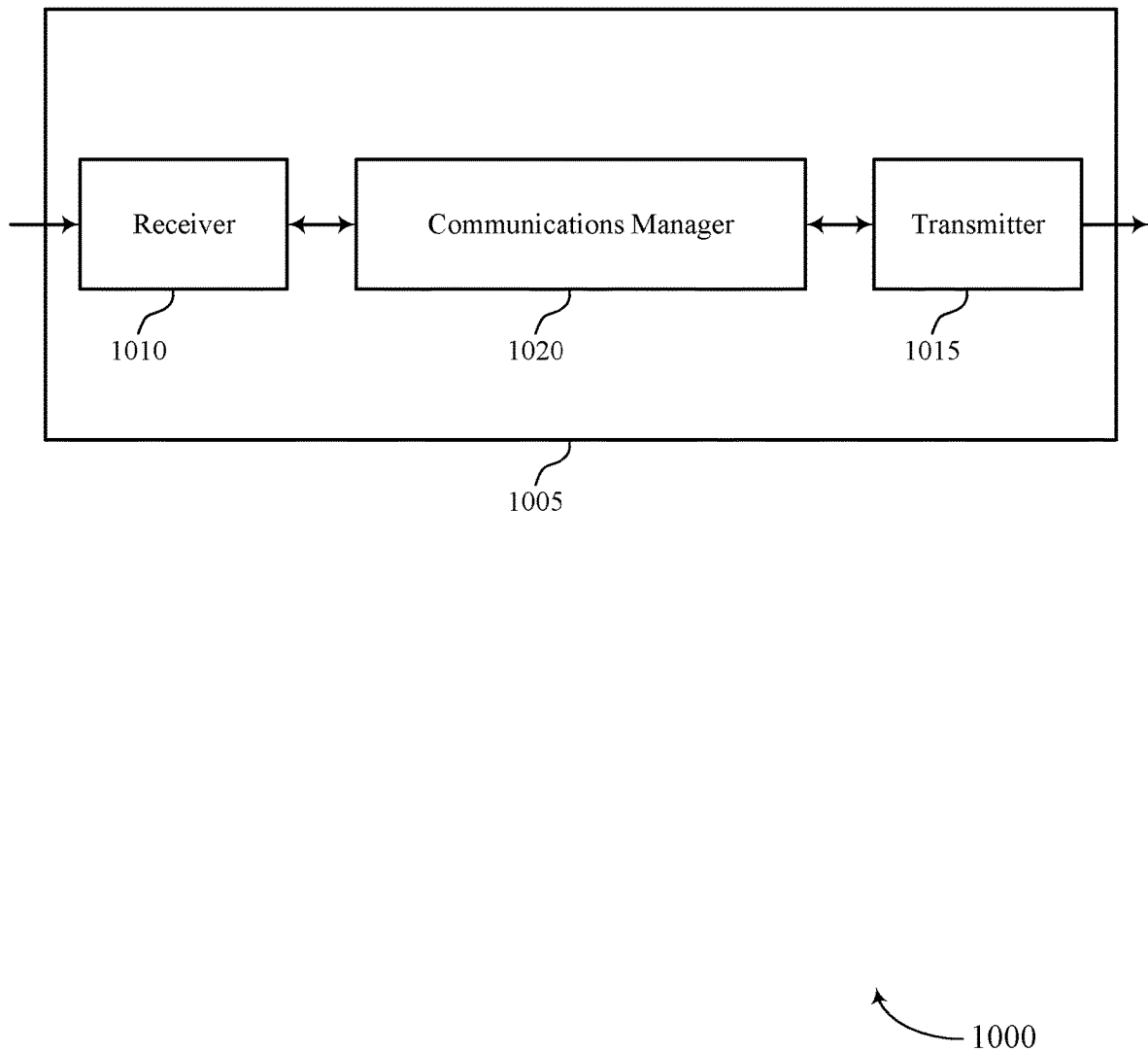
FIGS. 10 and 11 show block diagrams of devices that support efficient initial acquisition with gain state prediction using ML in accordance with one or more aspects of the present disclosure.

FIG. 10 shows a block diagram 1000 of a device 1005 that supports efficient initial acquisition with gain state prediction using machine learning in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of efficient initial acquisition with gain state prediction using machine learning as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network server in accordance with examples as disclosed herein. For example, the communications manager 1020 is capable of, configured to, or operable to support a means for receiving, from a set of multiple user equipments (UEs), local neighborhood data including a set of multiple values for a set of multiple input parameters. The communications manager 1020 is capable of, configured to, or operable to support a means for receiving, from a first UE, a request for crowdsourced values for the set of multiple input parameters. The communications manager 1020 is capable of, configured to, or operable to support a means for transmitting, to the first UE based on receiving the request, the local neighborhood data.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for a UE to predict a gain state to use in an initial acquisition procedure, which may result in reduced latency.

Figure 11:
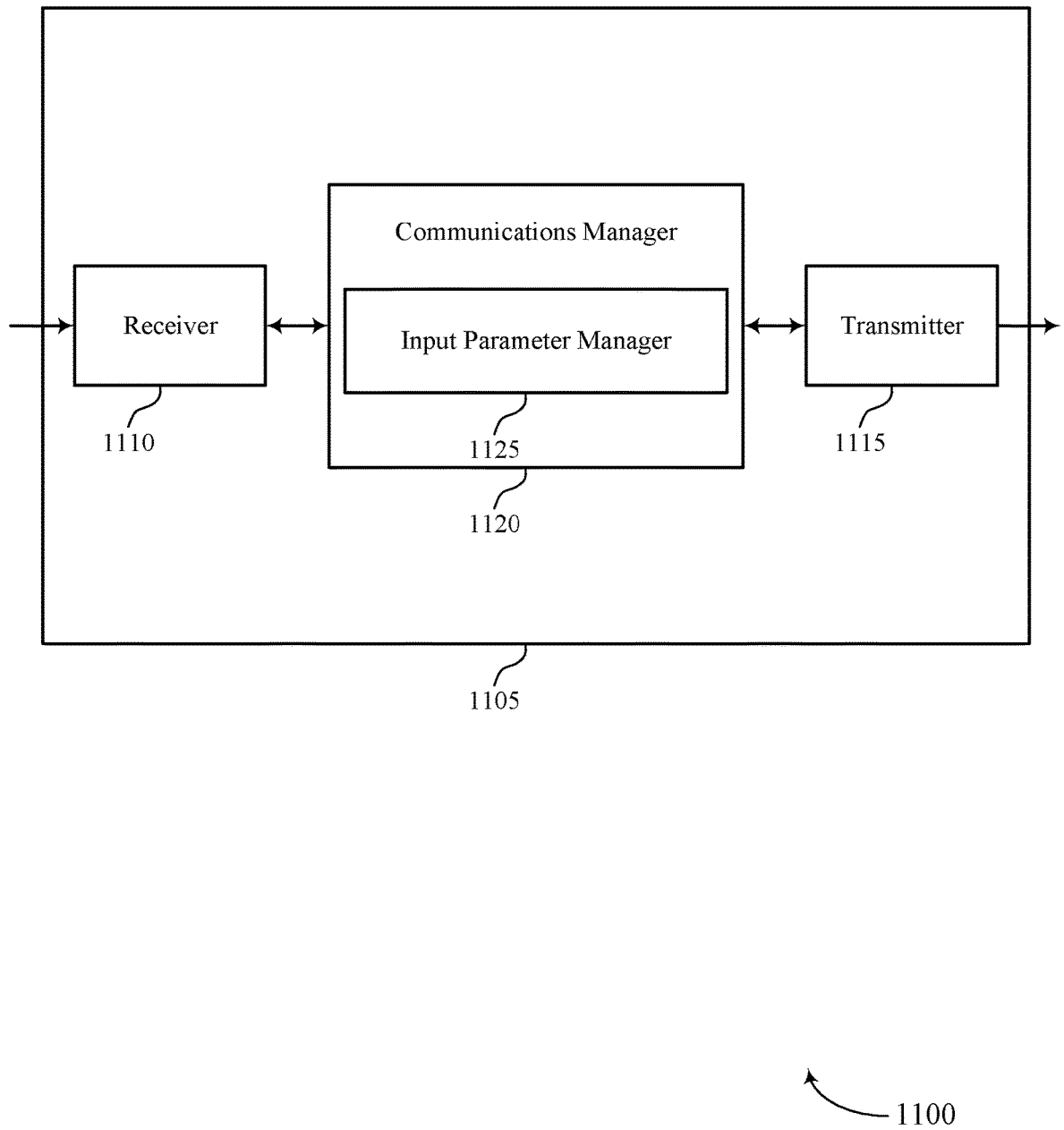

FIG. 11 shows a block diagram 1100 of a device 1105 that supports efficient initial acquisition with gain state prediction using machine learning in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of efficient initial acquisition with gain state prediction using machine learning as described herein. For example, the communications manager 1120 may include an input parameter manager 1125, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network server in accordance with examples as disclosed herein. The input parameter manager 1125 is capable of, configured to, or operable to support a means for receiving, from a set of multiple user equipments (UEs), local neighborhood data including a set of multiple values for a set of multiple input parameters. The input parameter manager 1125 is capable of, configured to, or operable to support a means for receiving, from a first UE, a request for crowdsourced values for the set of multiple input parameters. The input parameter manager 1125 is capable of, configured to, or operable to support a means for transmitting, to the first UE based on receiving the request, the local neighborhood data.

Figure 12:
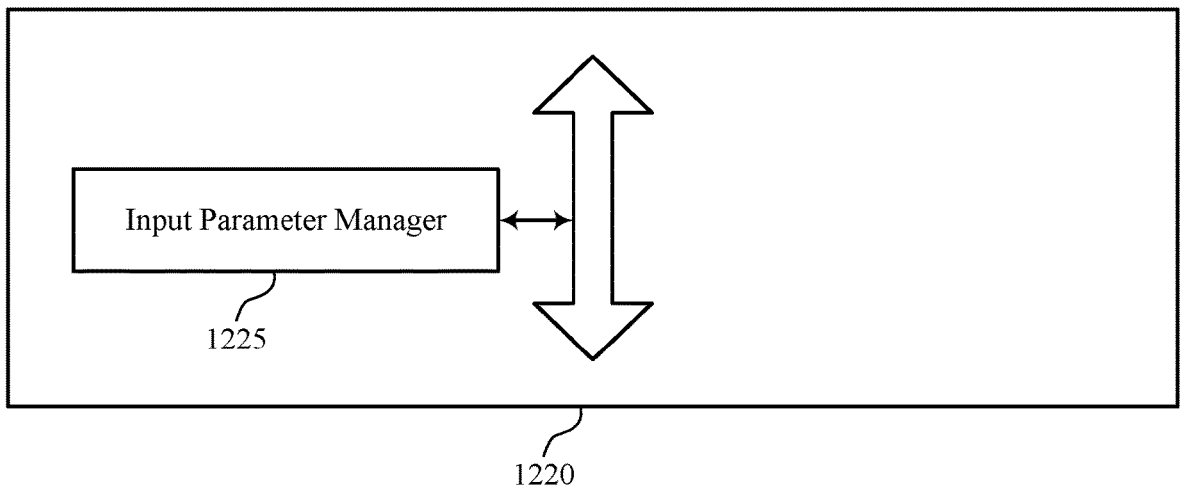
FIG. 12 shows a block diagram of a communications manager that supports efficient initial acquisition with gain state prediction using ML in accordance with one or more aspects of the present disclosure.

FIG. 12 shows a block diagram 1200 of a communications manager 1220 that supports efficient initial acquisition with gain state prediction using machine learning in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of efficient initial acquisition with gain state prediction using machine learning as described herein. For example, the communications manager 1220 may include an input parameter manager 1225, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network server in accordance with examples as disclosed herein. The input parameter manager 1225 is capable of, configured to, or operable to support a means for receiving, from a set of multiple user equipments (UEs), local neighborhood data including a set of multiple values for a set of multiple input parameters. In some examples, the input parameter manager 1225 is capable of, configured to, or operable to support a means for receiving, from a first UE, a request for crowdsourced values for the set of multiple input parameters. In some examples, the input parameter manager 1225 is capable of, configured to, or operable to support a means for transmitting, to the first UE based on receiving the request, the local neighborhood data.

In some examples, to support transmitting the local neighborhood data, the input parameter manager 1225 is capable of, configured to, or operable to support a means for transmitting, to the first UE, a subset of the set of multiple values for the set of multiple input parameters corresponding to a geographic location of the first UE based on collecting the local neighborhood data form the set of multiple UEs.

Figure 13:
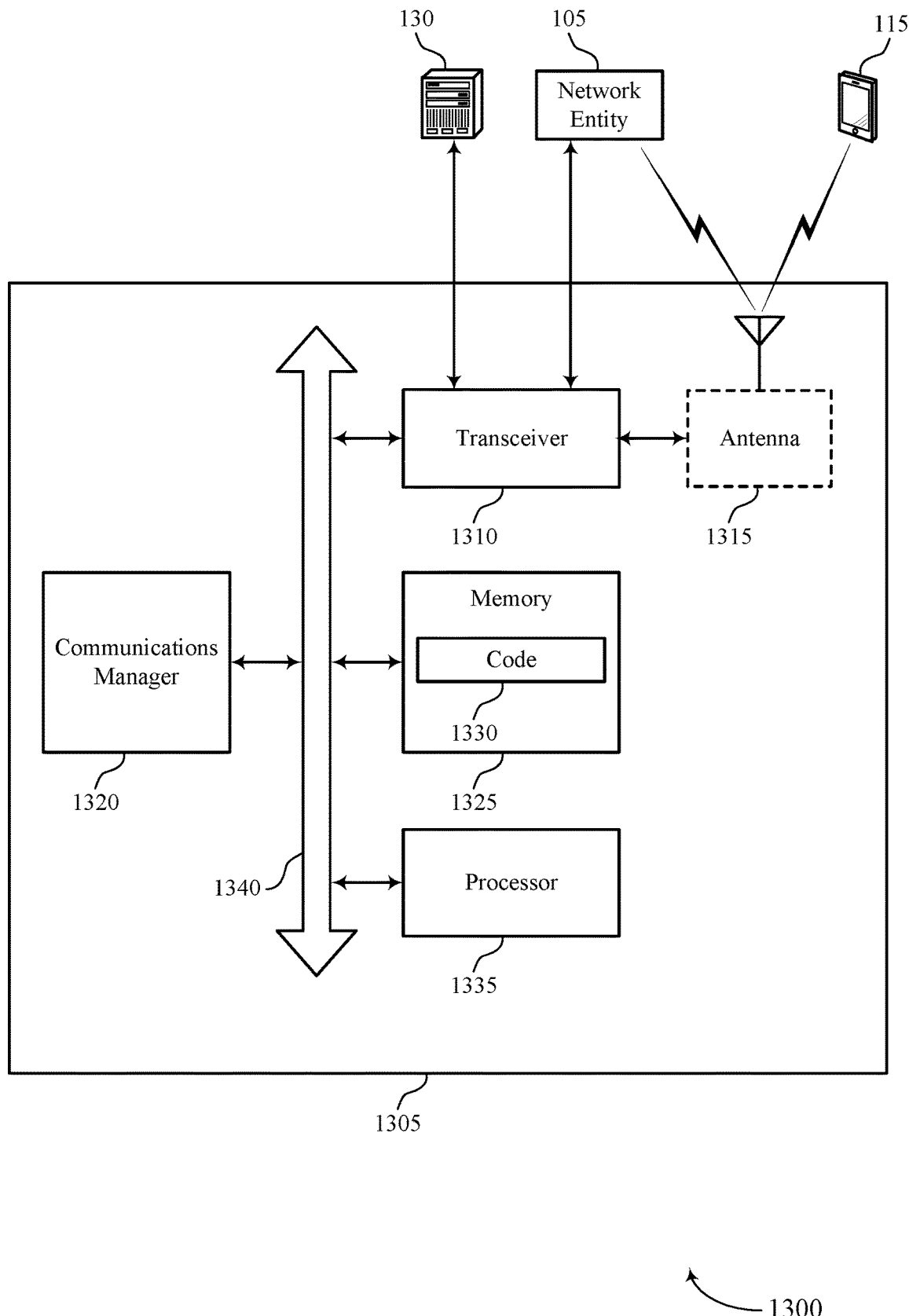
FIG. 13 shows a diagram of a system including a device that supports efficient initial acquisition with gain state prediction using ML in accordance with one or more aspects of the present disclosure.

FIG. 13 shows a diagram of a system 1300 including a device 1305 that supports efficient initial acquisition with gain state prediction using machine learning in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting efficient initial acquisition with gain state prediction using machine learning). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network server in accordance with examples as disclosed herein. For example, the communications manager 1320 is capable of, configured to, or operable to support a means for receiving, from a set of multiple user equipments (UEs), local neighborhood data including a set of multiple values for a set of multiple input parameters. The communications manager 1320 is capable of, configured to, or operable to support a means for receiving, from a first UE, a request for crowdsourced values for the set of multiple input parameters. The communications manager 1320 is capable of, configured to, or operable to support a means for transmitting, to the first UE based on receiving the request, the local neighborhood data.

By including or configuring the communications manager 1320 in accordance with examples as described herein, the device 1305 may support techniques for a UE to predict a gain state to use in an initial acquisition procedure, which may result in improved user experience related to reduced latency.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of efficient initial acquisition with gain state prediction using machine learning as described herein, or the processor 1335 and the memory 1325 may be otherwise configured to perform or support such operations.

Figure 14:
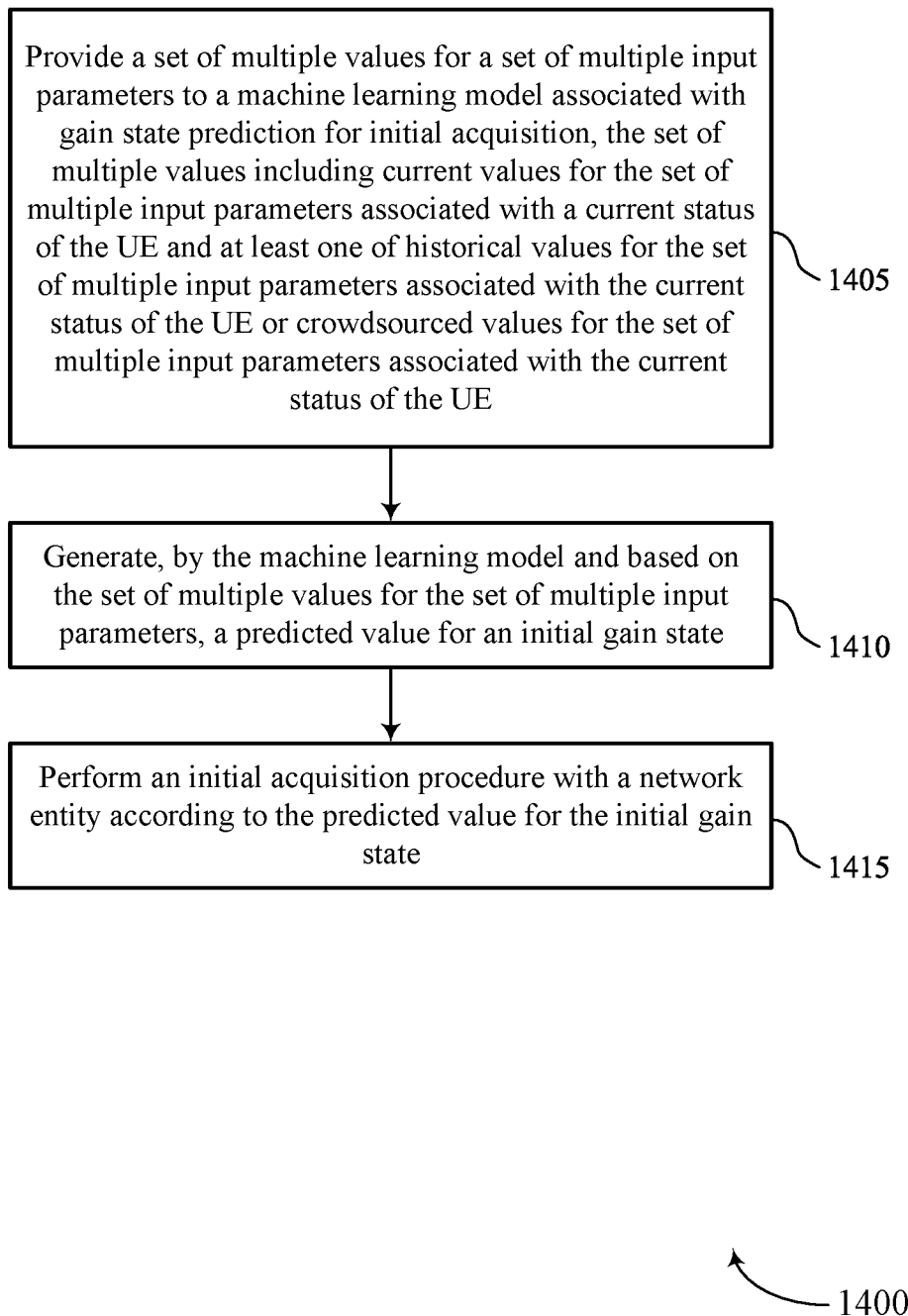
FIGS. 14 through 17 show flowcharts illustrating methods that support efficient initial acquisition with gain state prediction using ML in accordance with one or more aspects of the present disclosure.

FIG. 14 shows a flowchart illustrating a method 1400 that supports efficient initial acquisition with gain state prediction using machine learning in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1405, the method may include providing a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE. The operations of 1405 may be performed in accordance with examples as disclosed herein. In some examples, aspects of the operations of 1405 may be performed by an input parameter manager 825 as described with reference to FIG. 8.

At 1410, the method may include generating, by the machine learning model and based on the set of multiple values for the set of multiple input parameters, a predicted value for an initial gain state. The operations of 1410 may be performed in accordance with examples as disclosed herein. In some examples, aspects of the operations of 1410 may be performed by an ML model manager 830 as described with reference to FIG. 8.

At 1415, the method may include performing an initial acquisition procedure with a network entity according to the predicted value for the initial gain state. The operations of 1415 may be performed in accordance with examples as disclosed herein. In some examples, aspects of the operations of 1415 may be performed by an initial acquisition manager 835 as described with reference to FIG. 8.

Figure 15:
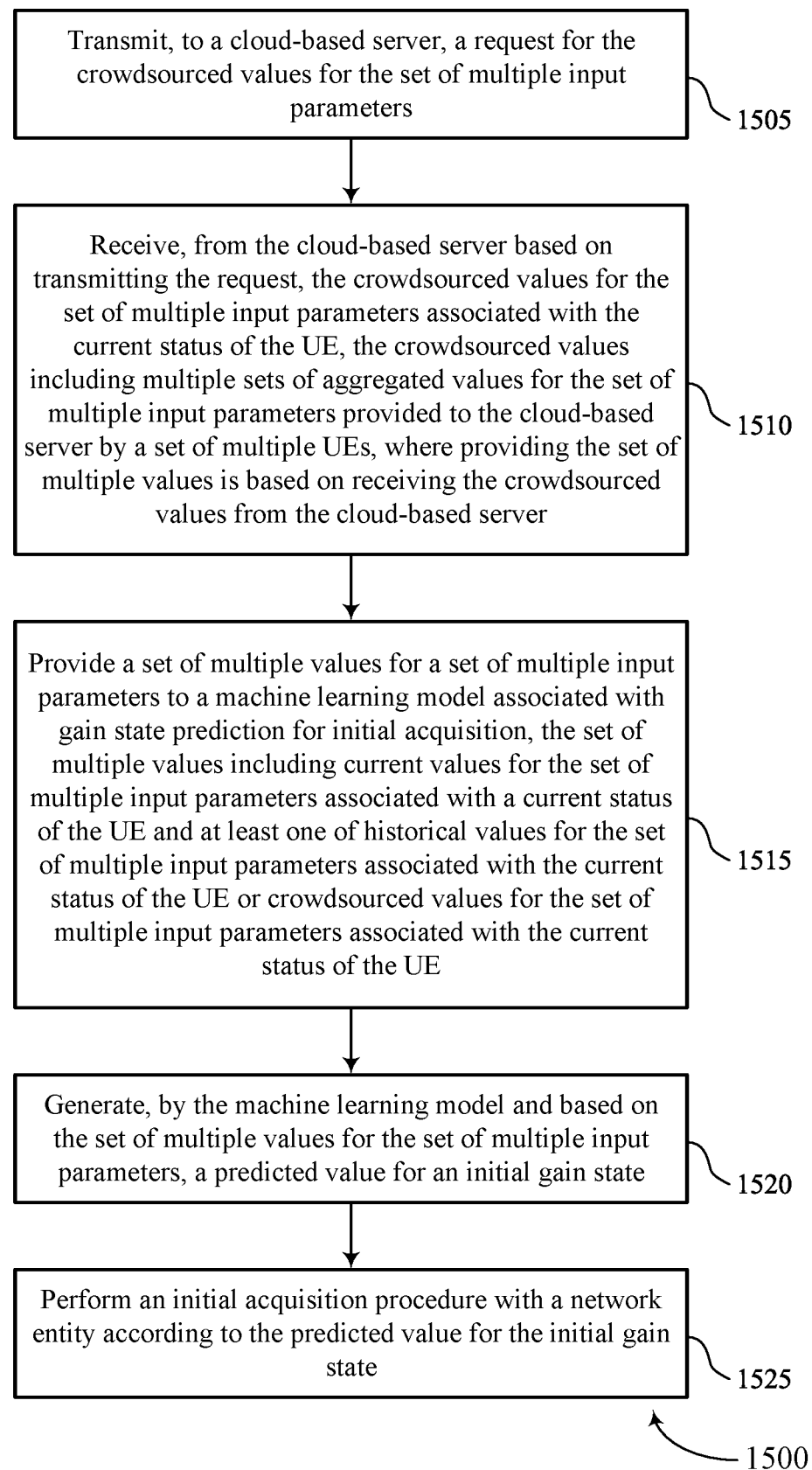

FIG. 15 shows a flowchart illustrating a method 1500 that supports efficient initial acquisition with gain state prediction using machine learning in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1505, the method may include transmitting, to a cloud-based server, a request for the crowdsourced values for the set of multiple input parameters. The operations of 1505 may be performed in accordance with examples as disclosed herein. In some examples, aspects of the operations of 1505 may be performed by a cloud-based server manager 840 as described with reference to FIG. 8.

At 1510, the method may include receiving, from the cloud-based server based on transmitting the request, the crowdsourced values for the set of multiple input parameters associated with the current status of the UE, the crowdsourced values including multiple sets of aggregated values for the set of multiple input parameters provided to the cloud-based server by a set of multiple UEs, where providing the set of multiple values is based on receiving the crowdsourced values from the cloud-based server. The operations of 1510 may be performed in accordance with examples as disclosed herein. In some examples, aspects of the operations of 1510 may be performed by an input parameter manager 825 as described with reference to FIG. 8.

At 1515, the method may include providing a set of multiple values for a set of multiple input parameters to a machine learning model associated with gain state prediction for initial acquisition, the set of multiple values including current values for the set of multiple input parameters associated with a current status of the UE and at least one of historical values for the set of multiple input parameters associated with the current status of the UE or crowdsourced values for the set of multiple input parameters associated with the current status of the UE. The operations of 1515 may be performed in accordance with examples as disclosed herein. In some examples, aspects of the operations of 1515 may be performed by an input parameter manager 825 as described with reference to FIG. 8.

At 1520, the method may include generating, by the machine learning model and based on the set of multiple values for the set of multiple input parameters, a predicted value for an initial gain state. The operations of 1520 may be performed in accordance with examples as disclosed herein. In some examples, aspects of the operations of 1520 may be performed by an ML model manager 830 as described with reference to FIG. 8.

At 1525, the method may include performing an initial acquisition procedure with a network entity according to the predicted value for the initial gain state. The operations of 1525 may be performed in accordance with examples as disclosed herein. In some examples, aspects of the operations of 1525 may be performed by an initial acquisition manager 835 as described with reference to FIG. 8.

Figure 16:
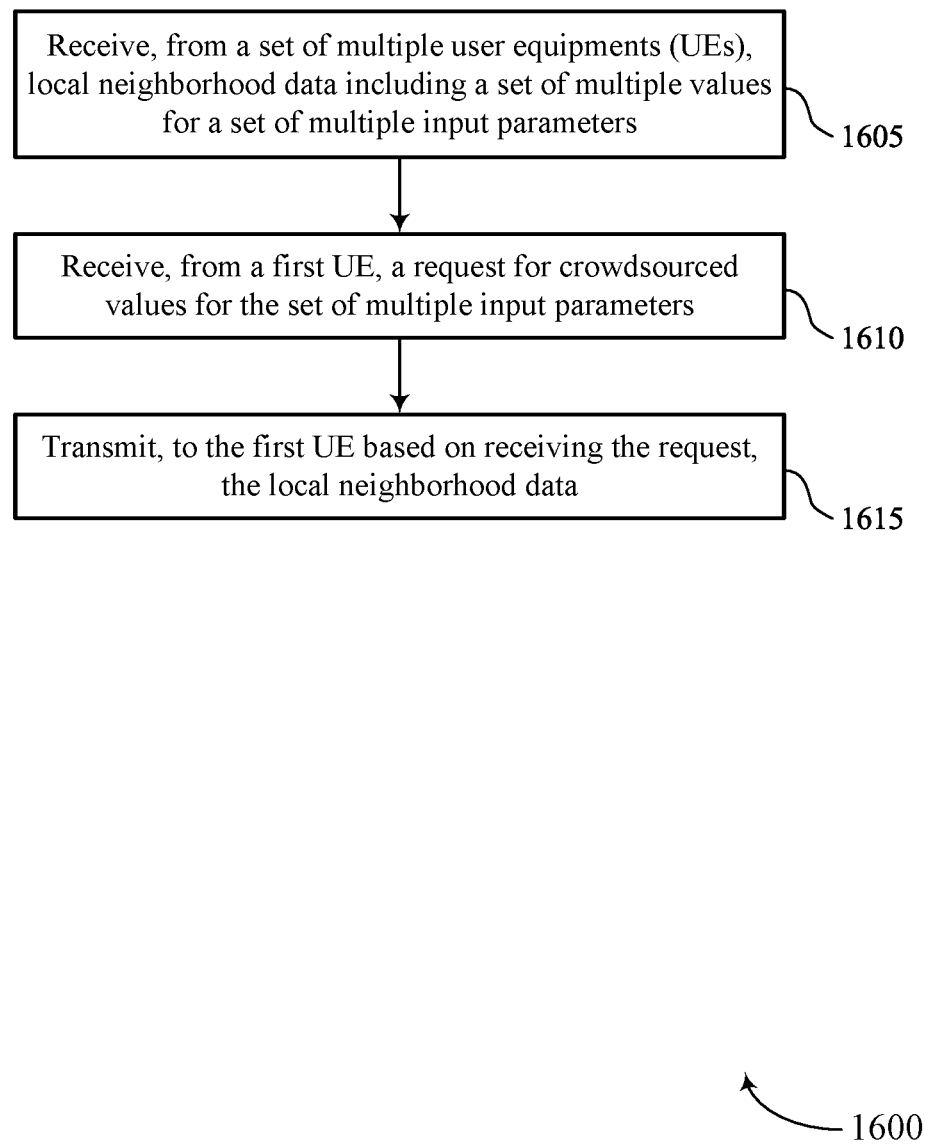

FIG. 16 shows a flowchart illustrating a method 1600 that supports efficient initial acquisition with gain state prediction using machine learning in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include receiving, from a set of multiple user equipments (UEs), local neighborhood data including a set of multiple values for a set of multiple input parameters. The operations of 1605 may be performed in accordance with examples as disclosed herein. In some examples, aspects of the operations of 1605 may be performed by an input parameter manager 1225 as described with reference to FIG. 12.

At 1610, the method may include receiving, from a first UE, a request for crowdsourced values for the set of multiple input parameters. The operations of 1610 may be performed in accordance with examples as disclosed herein. In some examples, aspects of the operations of 1610 may be performed by an input parameter manager 1225 as described with reference to FIG. 12.

At 1615, the method may include transmitting, to the first UE based on receiving the request, the local neighborhood data. The operations of 1615 may be performed in accordance with examples as disclosed herein. In some examples, aspects of the operations of 1615 may be performed by an input parameter manager 1225 as described with reference to FIG. 12.

Figure 17:
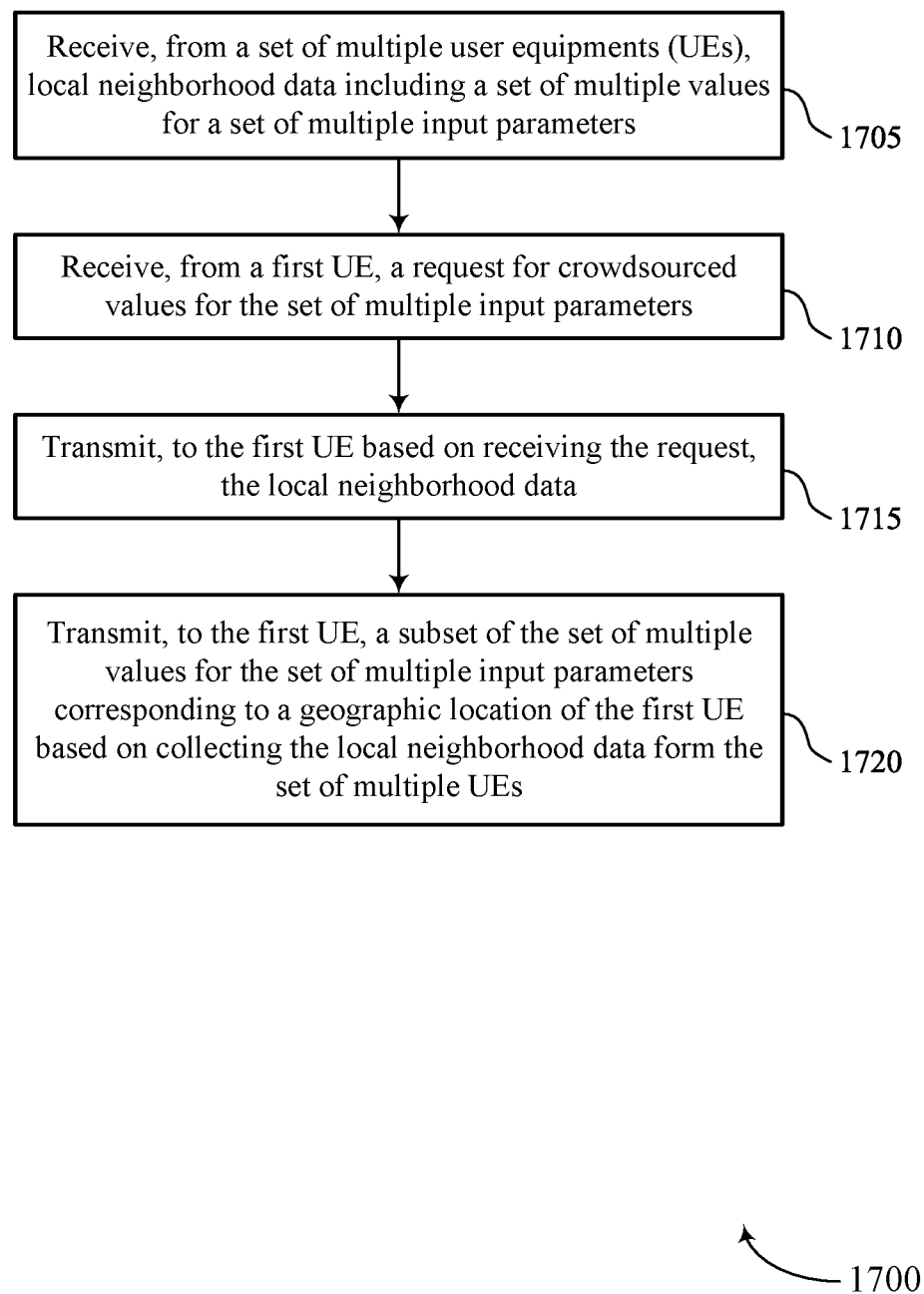

FIG. 17 shows a flowchart illustrating a method 1700 that supports efficient initial acquisition with gain state prediction using machine learning in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1705, the method may include receiving, from a set of multiple user equipments (UEs), local neighborhood data including a set of multiple values for a set of multiple input parameters. The operations of 1705 may be performed in accordance with examples as disclosed herein. In some examples, aspects of the operations of 1705 may be performed by an input parameter manager 1225 as described with reference to FIG. 12.

At 1710, the method may include receiving, from a first UE, a request for crowdsourced values for the set of multiple input parameters. The operations of 1710 may be performed in accordance with examples as disclosed herein. In some examples, aspects of the operations of 1710 may be performed by an input parameter manager 1225 as described with reference to FIG. 12.

At 1715, the method may include transmitting, to the first UE based on receiving the request, the local neighborhood data. The operations of 1715 may be performed in accordance with examples as disclosed herein. In some examples, aspects of the operations of 1715 may be performed by an input parameter manager 1225 as described with reference to FIG. 12.

At 1720, the method may include transmitting, to the first UE, a subset of the set of multiple values for the set of multiple input parameters corresponding to a geographic location of the first UE based on collecting the local neighborhood data form the set of multiple UEs. The operations of 1720 may be performed in accordance with examples as disclosed herein. In some examples, aspects of the operations of 1720 may be performed by an input parameter manager 1225 as described with reference to FIG. 12.

The following provides an overview of aspects of the present disclosure:

Aspect 1: A method for wireless communications at a UE, the method comprising: providing a plurality of values for a plurality of input parameters to a machine learning model associated with gain state prediction for initial acquisition, the plurality of values comprising current values for the plurality of input parameters associated with a current status of the UE and at least one of historical values for the plurality of input parameters associated with the current status of the UE or crowdsourced values for the plurality of input parameters associated with the current status of the UE; generating, by the machine learning model and based at least in part on the plurality of values for the plurality of input parameters, a predicted value for an initial gain state; and performing an initial acquisition procedure with a network entity according to the predicted value for the initial gain state.

Aspect 2: The method of aspect 1, further comprising: transmitting, to a cloud-based server, a request for the crowdsourced values for the plurality of input parameters; and receiving, from the cloud-based server based at least in part on transmitting the request, the crowdsourced values for the plurality of input parameters associated with the current status of the UE, the crowdsourced values comprising multiple sets of aggregated values for the plurality of input parameters provided to the cloud-based server by a plurality of UEs, wherein providing the plurality of values is based at least in part on receiving the crowdsourced values from the cloud-based server.

Aspect 3: The method of any of aspects 1 through 2, further comprising: transmitting, to a network server, a request for the crowdsourced values for the plurality of input parameters; and receiving, from the network server based at least in part on transmitting the request, the crowdsourced values for the plurality of input parameters associated with the current status of the UE, the crowdsourced values comprising multiple sets of aggregated values for the plurality of input parameters shared between a plurality of UEs associated with the network server, a plurality of network entities associated with the network server, or a combination thereof, wherein providing the plurality of values is based at least in part on receiving the crowdsourced values from the network server.

Aspect 4: The method of aspect 3, further comprising: receiving, from the network server based at least in part on transmitting the request, local neighbor data; and collecting the local neighbor data in local data history information.

Aspect 5: The method of any of aspects 1 through 4, further comprising: accessing the historical values for the plurality of input parameters associated with the current status of the UE via a short term memory or a long term memory at the UE, wherein providing the plurality of values is based at least in part on accessing the historical values.

Aspect 6: The method of any of aspects 1 through 5, wherein performing the initial acquisition procedure comprises: performing initial acquisition with a first operator via a first subscriber identity module; and performing initial acquisition with a second operator via a second subscriber identity module, wherein the current values for the plurality of input parameters associated with a current status of the UE comprise a first subset of current values associated with the first subscriber identity module and a second subset of current values associated with the second subscriber identity module, and wherein the historical values or the crowdsourced values comprises a first subset of historical values or crowdsourced values associated with the first subscriber identity module and a second subset of the historical values or crowdsourced values associated with the second subscriber identity module.

Aspect 7: The method of any of aspects 1 through 6, wherein the initial acquisition procedure is associated with a deep acquisition scan, a shallow acquisition scan, a radio link failure acquisition scan, a public land mobile network acquisition scan, or any combination thereof.

Aspect 8: The method of any of aspects 1 through 7, further comprising: transmitting an initial acquisition report to a cloud-based server, a network server, or both, the initial acquisition report comprising an indication of the plurality of values for the plurality of input parameters and an indication of whether the initial acquisition procedure was successful.

Aspect 9: The method of any of aspects 1 through 8, further comprising: receiving an indication of a default value for the initial gain state that is different than the predicted value for the initial gain state; and selecting, from the default value and the predicted value, the predicted value for the initial gain state based at least in part on generating the predicted value for the initial gain state by the machine learning model.

Aspect 10: The method of any of aspects 1 through 9, wherein the plurality of input parameters comprises one or more of a location parameter, a mobility information parameter, a gain state information parameter, a channel state information parameter, a cyclic redundancy check parameter, or any combination thereof.

Aspect 11: A method for wireless communications at a network server, the method comprising: receiving, from a plurality of user equipments (UEs), local neighborhood data comprising a plurality of values for a plurality of input parameters; receiving, from a first UE, a request for crowdsourced values for the plurality of input parameters; and transmitting, to the first UE based at least in part on receiving the request, the local neighborhood data.

Aspect 12: The method of aspect 11, wherein transmitting the local neighborhood data comprises: transmitting, to the first UE, a subset of the plurality of values for the plurality of input parameters corresponding to a geographic location of the first UE based at least in part on collecting the local neighborhood data form the plurality of UEs.

Aspect 13: An apparatus for wireless communications at a UE, comprising a processor; memory coupled with the processor; and instructions stored in the memory and executable by the processor to cause the apparatus to perform a method of any of aspects 1 through 10.

Aspect 14: An apparatus for wireless communications at a UE, comprising at least one means for performing a method of any of aspects 1 through 10.

Aspect 15: A non-transitory computer-readable medium storing code for wireless communications at a UE, the code comprising instructions executable by a processor to perform a method of any of aspects 1 through 10.

Aspect 16: An apparatus for wireless communications at a network server, comprising a processor; memory coupled with the processor; and instructions stored in the memory and executable by the processor to cause the apparatus to perform a method of any of aspects 11 through 12.

Aspect 17: An apparatus for wireless communications at a network server, comprising at least one means for performing a method of any of aspects 11 through 12.

Aspect 18: A non-transitory computer-readable medium storing code for wireless communications at a network server, the code comprising instructions executable by a processor to perform a method of any of aspects 11 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
      provide a plurality of values for a plurality of input parameters to a machine learning model associated with gain state prediction for initial acquisition, the plurality of values comprising current values for the plurality of input parameters associated with a current status of the UE and at least one of historical values for the plurality of input parameters associated with the current status of the UE or crowdsourced values for the plurality of input parameters associated with the current status of the UE;
      generate, by the machine learning model and based at least in part on the plurality of values for the plurality of input parameters, a predicted value for an initial gain state;
      perform an initial acquisition procedure with a network entity according to the predicted value for the initial gain state; and
      transmit an initial acquisition report to a cloud-based server, a network server, or both, the initial acquisition report comprising an indication of the plurality of values for the plurality of input parameters and an indication of whether the initial acquisition procedure was successful.

2. The apparatus of claim 1, wherein the instructions are further executable by the one or more processors to cause the apparatus to:
   transmit, to a cloud-based server, a request for the crowdsourced values for the plurality of input parameters; and
   receive, from the cloud-based server based at least in part on transmitting the request, the crowdsourced values for the plurality of input parameters associated with the current status of the UE, the crowdsourced values comprising multiple sets of aggregated values for the plurality of input parameters provided to the cloud-based server by a plurality of UEs,
   wherein providing the plurality of values is based at least in part on receiving the crowdsourced values from the cloud-based server.

3. The apparatus of claim 1, wherein the instructions are further executable by the one or more processors to cause the apparatus to:
   transmit, to a network server, a request for the crowdsourced values for the plurality of input parameters; and
   receive, from the network server based at least in part on transmitting the request, the crowdsourced values for the plurality of input parameters associated with the current status of the UE, the crowdsourced values comprising multiple sets of aggregated values for the plurality of input parameters shared between a plurality of UEs associated with the network server, a plurality of network entities associated with the network server, or a combination thereof,
   wherein providing the plurality of values is based at least in part on receiving the crowdsourced values from the network server.

4. The apparatus of claim 3, wherein the instructions are further executable by the one or more processors to cause the apparatus to:
   receive, from the network server based at least in part on transmitting the request, local neighbor data; and
   collect the local neighbor data in local data history information.

5. The apparatus of claim 1, wherein the instructions are further executable by the one or more processors to cause the apparatus to:
   access the historical values for the plurality of input parameters associated with the current status of the UE via a short term memory or a long term memory at the UE,
   wherein providing the plurality of values is based at least in part on accessing the historical values.

6. The apparatus of claim 1, wherein the instructions to perform the initial acquisition procedure are executable by the one or more processors to cause the apparatus to:
   perform initial acquisition with a first operator via a first subscriber identity module; and
   perform initial acquisition with a second operator via a second subscriber identity module,
   wherein the current values for the plurality of input parameters associated with a current status of the UE comprise a first subset of current values associated with the first subscriber identity module and a second subset of current values associated with the second subscriber identity module, and wherein the historical values or the crowdsourced values comprises a first subset of historical values or crowdsourced values associated with the first subscriber identity module and a second subset of the historical values or crowdsourced values associated with the second subscriber identity module.

7. The apparatus of claim 1, wherein the initial acquisition procedure is associated with a deep acquisition scan, a shallow acquisition scan, a radio link failure acquisition scan, a public land mobile network acquisition scan, or any combination thereof.

8. The apparatus of claim 1, wherein the instructions are further executable by the one or more processors to cause the apparatus to:

receive an indication of a default value for the initial gain state that is different than the predicted value for the initial gain state; and select, from the default value and the predicted value, the predicted value for the initial gain state based at least in part on generating the predicted value for the initial gain state by the machine learning model.

9. The apparatus of claim 1, wherein the plurality of input parameters comprises one or more of a location parameter, a mobility information parameter, a gain state information parameter, a channel state information parameter, a cyclic redundancy check parameter, or any combination thereof.

10. An apparatus for wireless communications at a network server, comprising:
one or more processors;
one or more memories coupled with the one or more processors; and
instructions stored in the one or more memories and executable by the one or more processors to cause the apparatus to:
receive, from a plurality of user equipments (UEs), local neighborhood data comprising a plurality of values for a plurality of input parameters and an indication of whether an initial acquisition procedure was successful, wherein the plurality of input parameters comprises one or more of a location parameter, a mobility information parameter, a gain state information parameter, a channel state information parameter, a cyclic redundancy check parameter, or any combination thereof;
receive, from a first UE, a request for crowdsourced values for the plurality of input parameters; and
transmit, to the first UE based at least in part on receiving the request, the local neighborhood data based at least in part on the indication indicating that the initial acquisition procedure associated with the plurality of values for the plurality of input parameters was successful.

11. The apparatus of claim 10, wherein the instructions to transmit the local neighborhood data are executable by the one or more processors to cause the apparatus to:
transmit, to the first UE, a subset of the plurality of values for the plurality of input parameters corresponding to a geographic location of the first UE based at least in part on collecting the local neighborhood data form the plurality of UEs.

12. A method for wireless communications at a user equipment (UE), the method comprising:
providing a plurality of values for a plurality of input parameters to a machine learning model associated with gain state prediction for initial acquisition, the plurality of values comprising current values for the plurality of input parameters associated with a current status of the UE and at least one of historical values for the plurality of input parameters associated with the current status of the UE or crowdsourced values for the plurality of input parameters associated with the current status of the UE;
generating, by the machine learning model and based at least in part on the plurality of values for the plurality of input parameters, a predicted value for an initial gain state;
performing an initial acquisition procedure with a network entity according to the predicted value for the initial gain state; and
transmitting an initial acquisition report to a cloud-based server, a network server, or both, the initial acquisition report comprising an indication of the plurality of values for the plurality of input parameters and an indication of whether the initial acquisition procedure was successful.

13. The method of claim 12, further comprising:
transmitting, to a cloud-based server, a request for the crowdsourced values for the plurality of input parameters; and
receiving, from the cloud-based server based at least in part on transmitting the request, the crowdsourced values for the plurality of input parameters associated with the current status of the UE, the crowdsourced values comprising multiple sets of aggregated values for the plurality of input parameters provided to the cloud-based server by a plurality of UEs,
wherein providing the plurality of values is based at least in part on receiving the crowdsourced values from the cloud-based server.

14. The method of claim 12, further comprising:
transmitting, to a network server, a request for the crowdsourced values for the plurality of input parameters; and
receiving, from the network server based at least in part on transmitting the request, the crowdsourced values for the plurality of input parameters associated with the current status of the UE, the crowdsourced values comprising multiple sets of aggregated values for the plurality of input parameters shared between a plurality of UEs associated with the network server, a plurality of network entities associated with the network server, or a combination thereof, wherein providing the plurality of values is based at least in part on receiving the crowdsourced values from the network server.

15. The method of claim 14, further comprising:
receiving, from the network server based at least in part on transmitting the request, local neighbor data; and
collecting the local neighbor data in local data history information.

16. The method of claim 12, further comprising:
accessing the historical values for the plurality of input parameters associated with the current status of the UE via a short term memory or a long term memory at the UE, wherein providing the plurality of values is based at least in part on accessing the historical values.

17. The method of claim 12, wherein performing the initial acquisition procedure comprises:
performing initial acquisition with a first operator via a first subscriber identity module; and
performing initial acquisition with a second operator via a second subscriber identity module, wherein the current values for the plurality of input parameters associated with a current status of the UE comprise a first subset of current values associated with the first subscriber identity module and a second subset of current values associated with the second subscriber identity module, and wherein the historical values or the crowdsourced values comprises a first subset of historical values or crowdsourced values associated with the first subscriber identity module and a second subset of the historical values or crowdsourced values associated with the second subscriber identity module.

18. The method of claim 12, wherein the initial acquisition procedure is associated with a deep acquisition scan, a shallow acquisition scan, a radio link failure acquisition scan, a public land mobile network acquisition scan, or any combination thereof.

* * * * *